Nov. 14, 1944.  A. H. GOREY ET AL  2,362,815
SHUTTER CURTAIN MECHANISM PARTICULARLY FOR AERIAL CAMERAS
Original Filed April 1, 1942   11 Sheets-Sheet 11
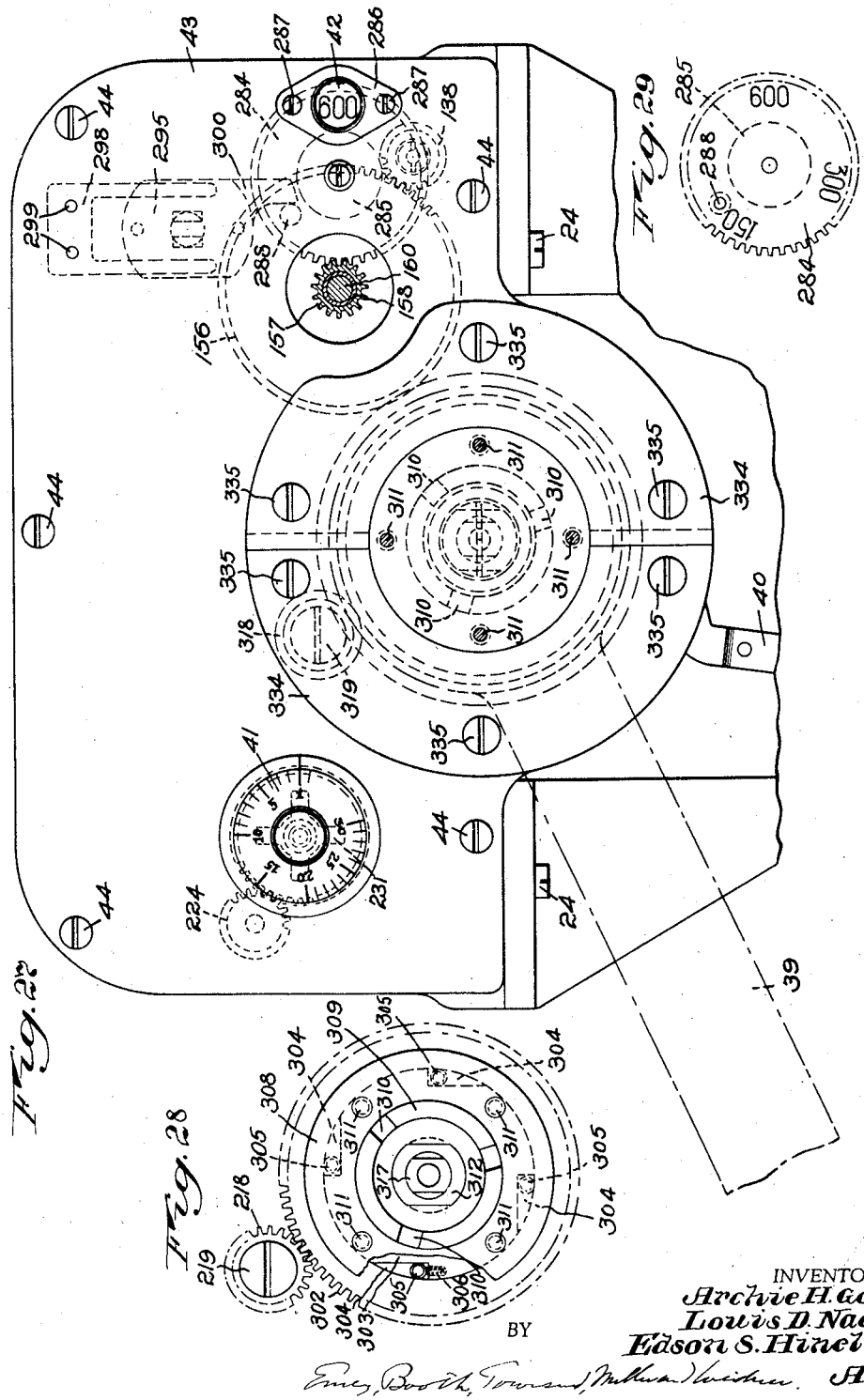
INVENTORS:
Archie H. Gorey,
Louis D. Nadet,
Edson S. Hineline
BY
Emery, Booth, Townsend, Mellinus Suisher. Attys Patented Nov. 14, 1944

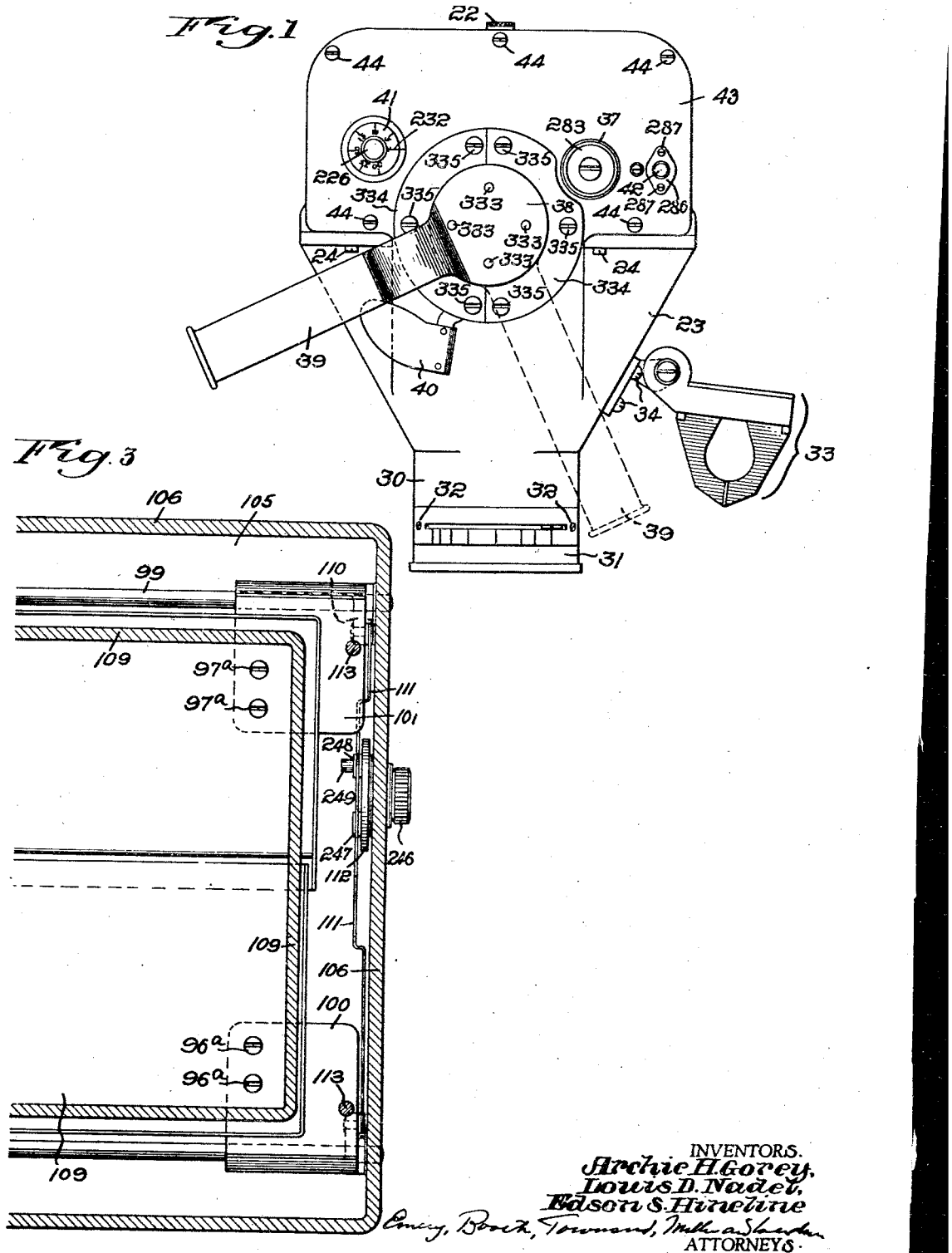

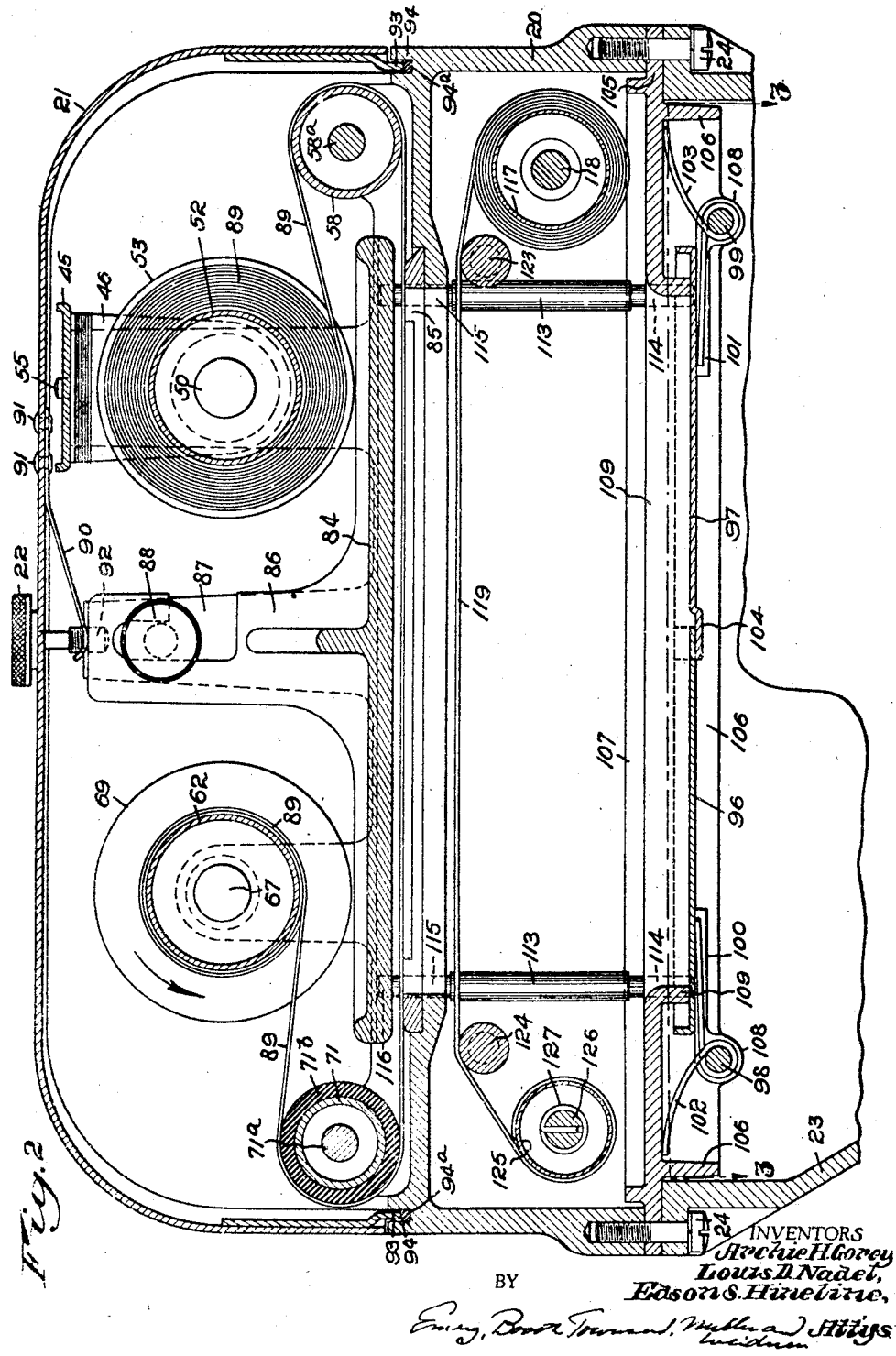

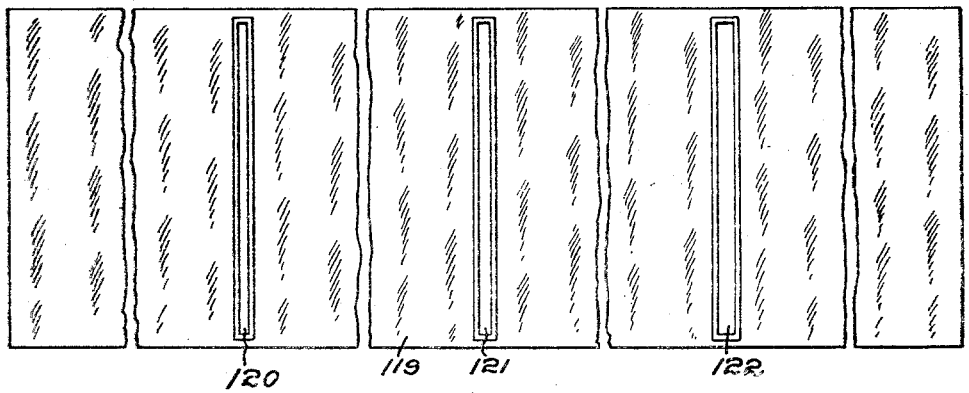
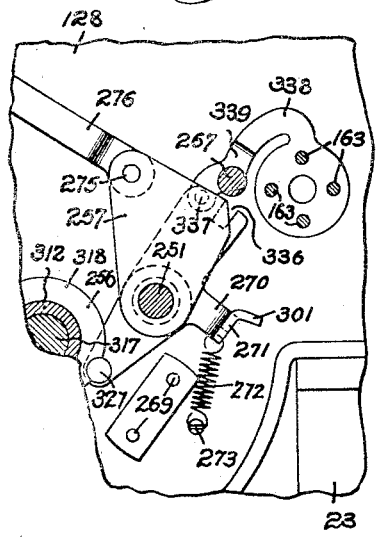

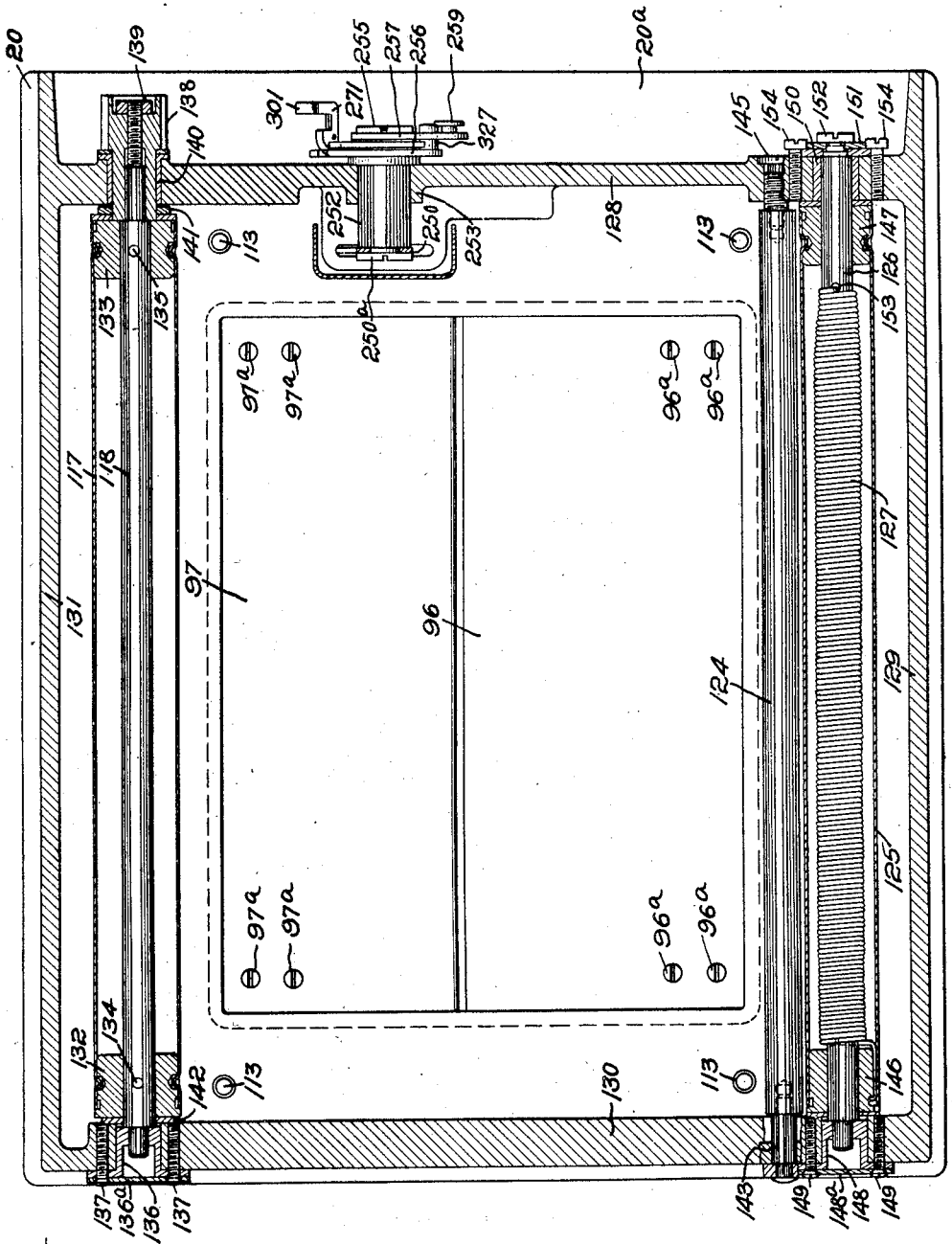

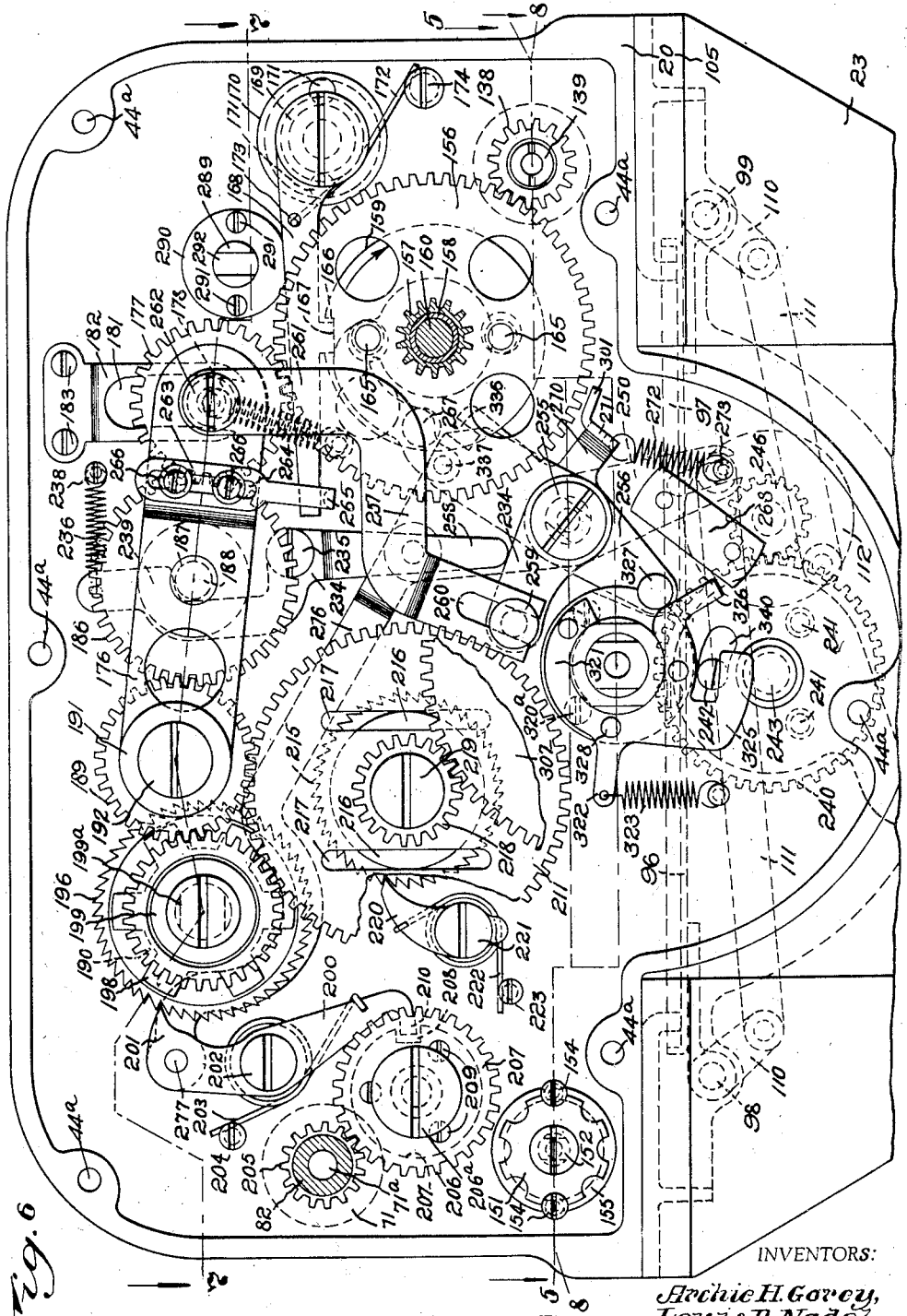

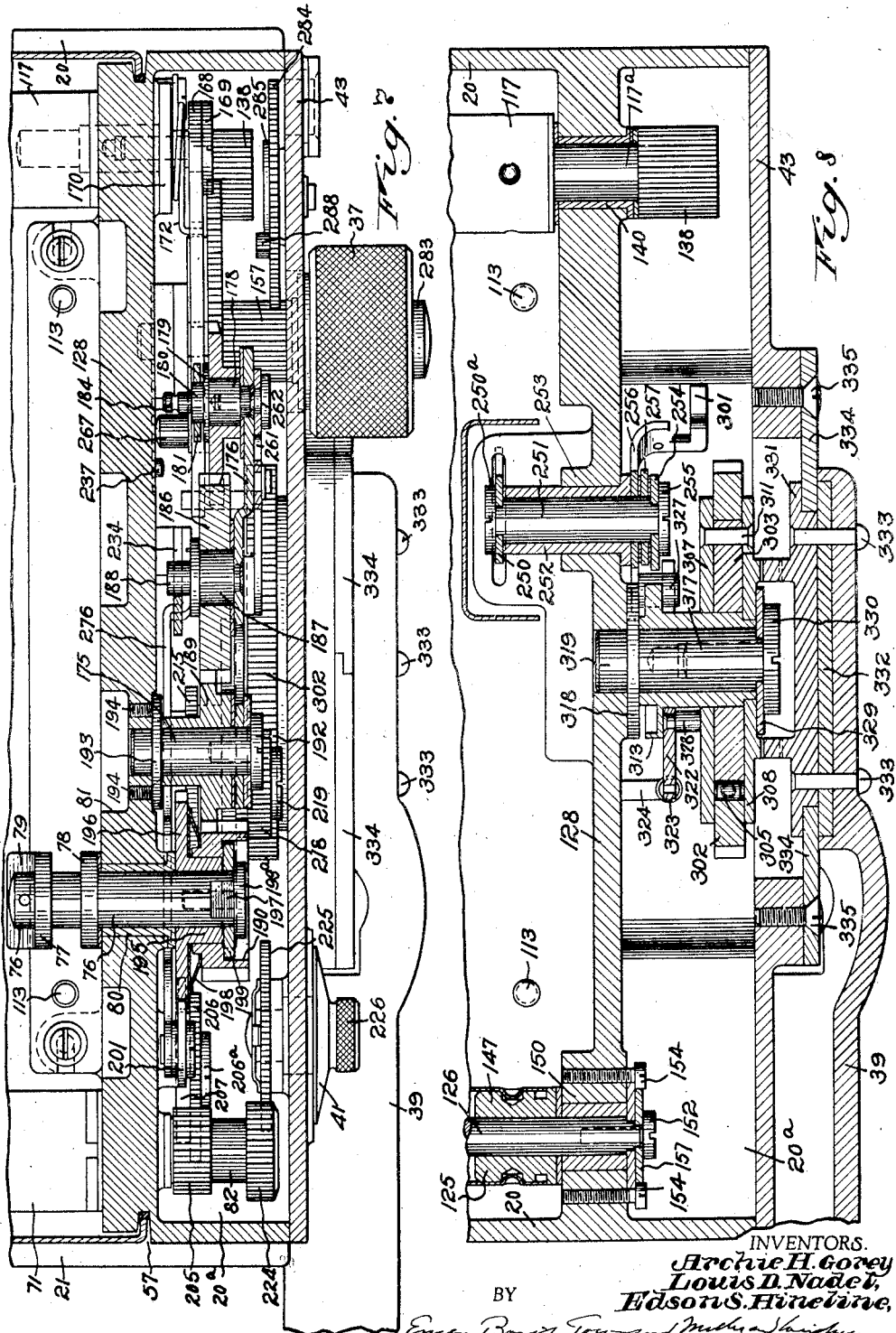

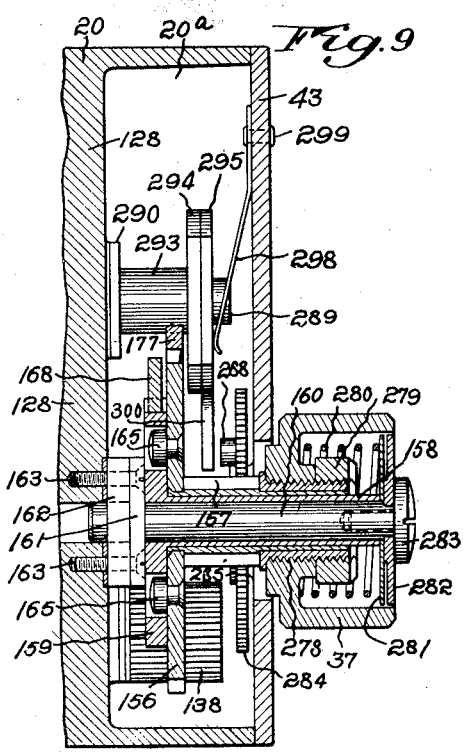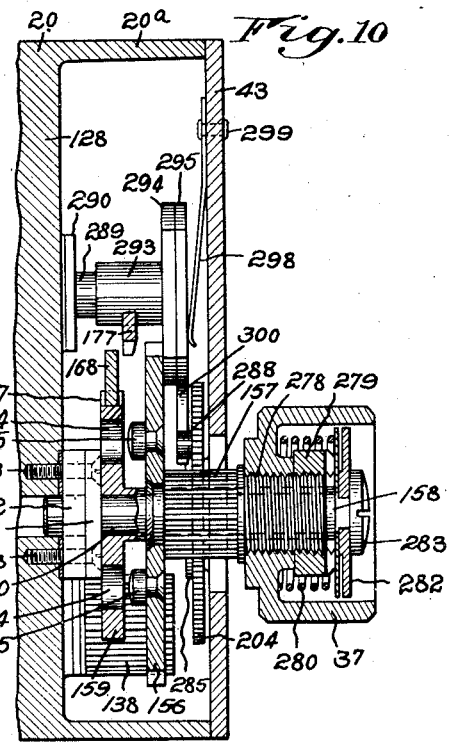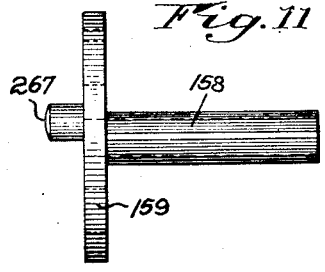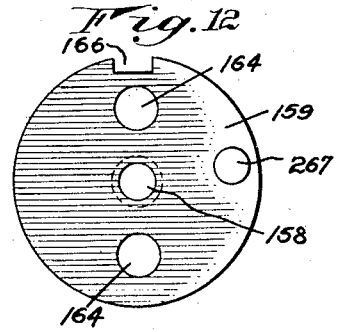

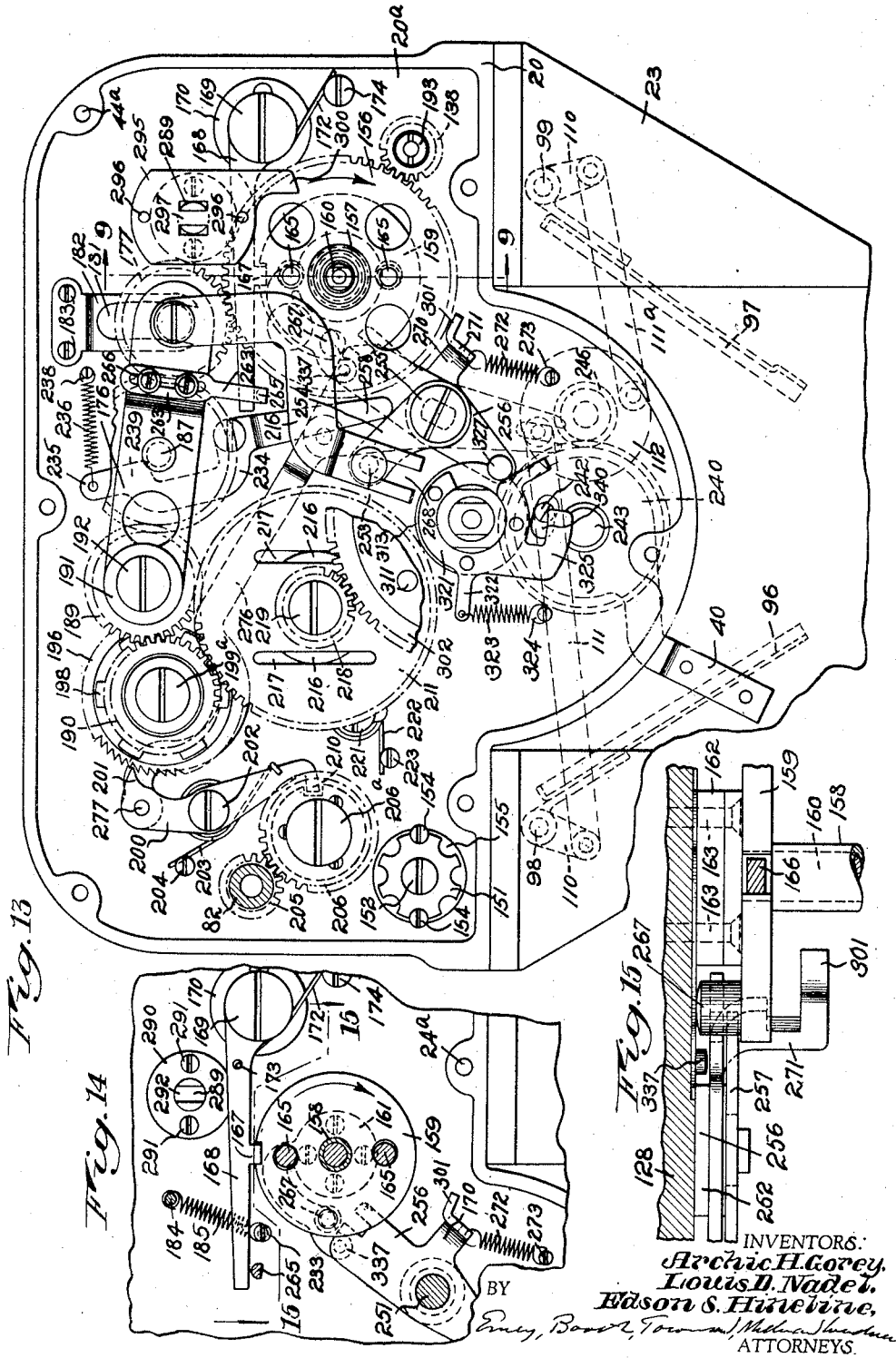

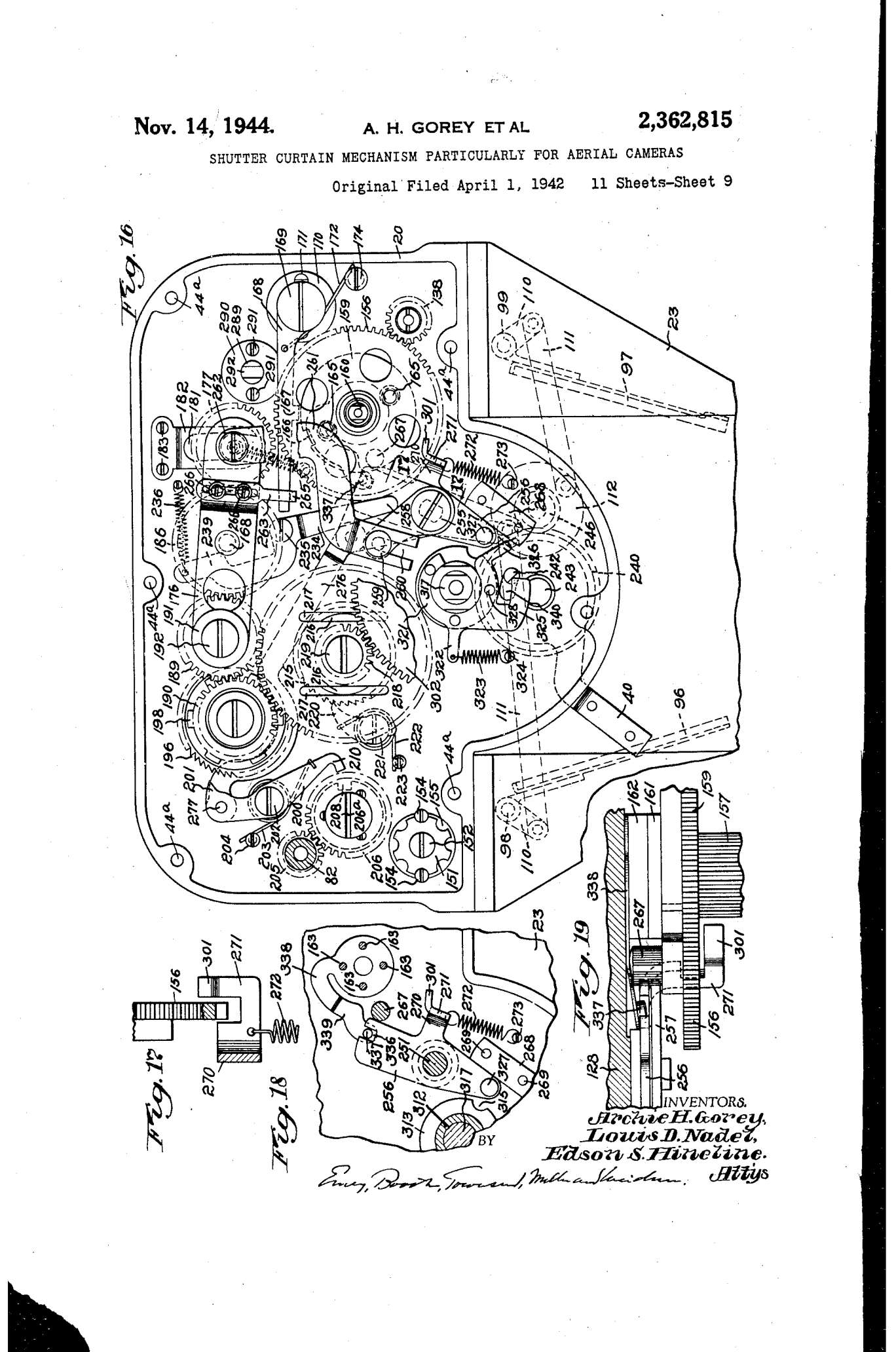

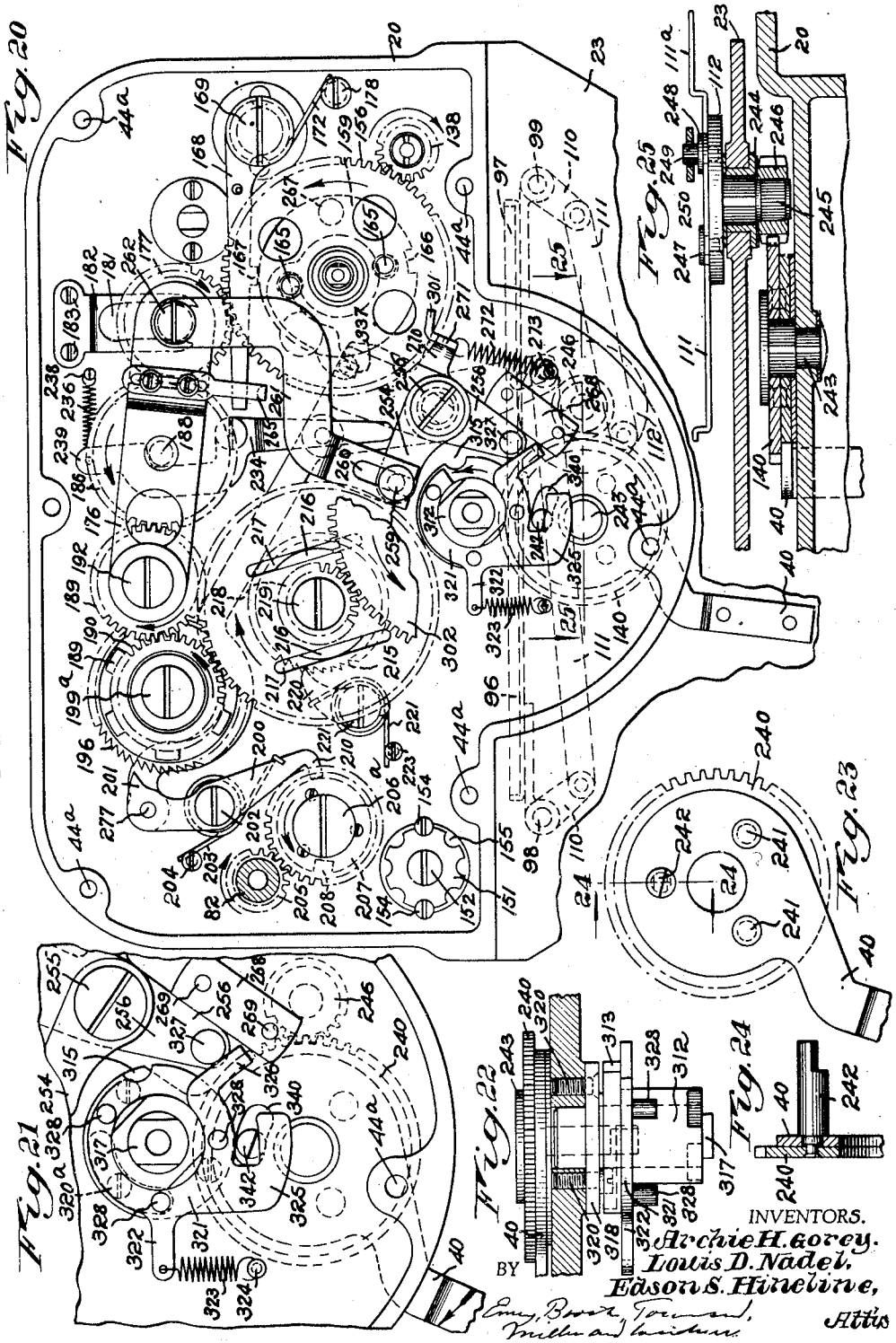

2,362,815

UNITED STATES PATENT OFFICE 2,362,815

SHUTTER CURTAIN MECHANISM, PARTICULARLY FOR AERIAL CAMERAS

Archie H. Gorey, Louis D. Nadel, and Edson S. Hineline, Rochester, N. Y., assignors to The Folmer Graflex Corporation, Rochester, N. Y., a corporation of Delaware Original application April 1, 1942, Serial No. 437,240. Divided and this application April 10, 1943, Serial No. 482,590

80 Claims. (Cl. 95—57)

This application is a division of our co-pending application Ser. No. 437,240, filed April 1, 1942.

This invention relates to shutter curtain mechanism particularly for aerial cameras.

In order that the principle of the invention may be readily understood, we have disclosed a single embodiment thereof in the accompanying drawings, wherein Fig. 1 is a right side elevation of the camera showing the shutter rewind handle in position ready for making an exposure, the position of the shutter release trigger being also shown and the forward position of the shutter operating handle being indicated in dotted lines, which is the position of the shutter operating handle when it has been moved all the way forward;

Fig. 2 is a section taken through the camera, showing the mounting of the film spools, the shutter curtain rolls, the pressure pad, and the capping gates, the latter being in a closed condition;

Fig. 3 is a partial horizontal section looking toward the lens taken on the line 3—3 of Fig. 2, showing the mounting of the capping gates and the mechanism for operating them;

Fig. 4 is a detail of the shutter curtain, showing its several apertures;

Fig. 5 is a horizontal section through the camera body taken on the line 5—5 of Fig. 6, showing the construction of the curtain rolls;

Fig. 6 is a right side elevation of the camera, with the mechanism cover removed, showing the mechanism with the shutter in rewound condition ready for making an exposure;

Fig. 7 is a section through the mechanism housing, taken on the line 7—7 of Fig. 6;

Fig. 8 is a partial horizontal section taken through Fig. 6 on the line 8—8 thereof with some of the parts removed;

Fig. 9 is a partial vertical section taken through Fig. 13 on the line 9—9 thereof, showing shutter setting mechanism when in the set or ready condition;

Fig. 10 is a view similar to Fig. 9, but with the shutter setting knob moved to the right to permit the selection of another curtain aperture;

Fig. 11 is a detail of the curtain latch member;

Fig. 12 is a left hand elevation of Fig. 11;

Fig. 13 is a view similar to Fig. 6, but with the camera release trigger partially moved in a direction to release the shutter, the capping gates being partially open, but the curtain not yet released;

Fig. 14 is a fragmentary view similar to Fig. 13, but having some of the parts removed to show more clearly the shutter latching means and one of the interlocks;

Fig. 15 is a fragmentary detail partially in section, taken on the line 15—15 of Fig. 14, showing one of the interlocks;

Fig. 16 is a view similar to Fig. 13, but with the shutter release member moved a sufficient distance to open fully the capping gates, disengage the winding gear, and release the shutter;

Fig. 17 is a detail partially in section of Fig. 16 on the line 17—17 thereof;

Fig. 18 is a fragmentary view similar to Fig. 16, but having some of the parts removed to show more clearly the operation of one of the rewind interlocks when the mechanism is in the condition shown in Fig. 16;

Fig. 19 is a view similar to Fig. 15, but shows the interlock as it appears when the mechanism is in the condition shown in Fig. 16;

Fig. 20 is a view similar to Fig. 16 but representing the shutter release trigger as having returned to the starting position, allowing the capping gates to be closed and allowing the winding gear to be engaged prior to rewinding the shutter for another exposure;

Fig. 21 is a fragmentary detail similar to Fig. 20, on an enlarged scale, and showing the position of the shutter release lever interlock when the mechanism is in the condition shown in Fig. 20;

Fig. 22 is a partial horizontal section taken through Fig. 21 to show more clearly the construction of the trigger interlock mechanism;

Fig. 23 is a detail of the shutter release member and capping gate driving gear;

Fig. 24 is a detail, partially in section, taken through Fig. 23 on the line 24—24 thereof;

Fig. 25 is a horizontal section taken through Fig. 20 on the line 25—25 thereof, and showing the capping gate operating gears;

Fig. 26 is a fragmentary view, but with some of the parts removed to show more clearly the construction of the rewind interlock;

Fig. 27 is a right hand elevation of the camera with a portion of the cone broken away and the operating handle removed, and showing the exposure counterdial, the shutter setting indicator opening, the shutter rewind and shutter setting gears being shown in dotted lines, the position of the operating handle when the shutter is in condition for operating being indicated in dotted lines;

Fig. 28 is a detail, partially in section, showing the camera rewind gear and driving clutch; and Fig. 29 is a detail of the exposure setting gear.

Objects of this invention are: to provide a camera, and particularly an aerial camera having a shutter curtain with shutter mechanism having means compelling the complete rewinding of the shutter before the exposure can be made, a second operation of the exposure release lever being impossible until the shutter curtain has been rewound; to provide a camera, and particularly an aerial camera, with mechanism for rapidly rewinding the shutter and with interlocking means to secure the proper positioning of the shutter curtain before an exposure can be made; to provide a wide range of shutter speeds, with means for readily changing such speeds; and to provide a simple exposure counter that is easily manipulated and accurate in performance.

Referring first to Fig. 1, there is disclosed the outside of the camera structure wherein the camera body or housing is indicated at 20, and is provided with a suitable mechanism housing. There is a film chamber provided with a film chamber cover held to the camera body 20 by knurled head screws 22, 22. There is a lens cone member 23 attached to the camera body 20 by screws 24, 24. The lens cone member 23 is also provided with the usual lens shade member 30 to which is attached a diaphragm scale 31 by means of screws 32, 32. Also attached to said lens cone member 23 is a direct vision view finder 33 preferably of the usual direct vision type, and it is held to the lens cone member 23 by screws 34, 34.

Protruding from the left-hand side of the camera body 20 is a shutter speed control knob 37 and a handle boss member 38 to which latter is attached a shutter operating handle 39. Extending from said protruding boss member 38 is a shutter release lever or trigger 40. The means for attaching the shutter operating handle 39 will be referred to in full detail at a later part of this description.

The shutter used in the herein disclosed camera is of the multiple aperture type subsequently described herein, at which point it will be made fully apparent that when the film is rewound for making a second exposure or when changing the aperture, it is necessary that all light passing through the lens be cut off from the sensitized film. The structure for accomplishing this result is best shown in Figs. 2 and 3. Therein the capping gates, indicated at 96, 97, are shown as pivoted on shafts 98, 99, respectively, by hinged members 100, 101, and the said capping gates are caused to be closed by springs 102, 103. Said capping gates 96, 97 are desirably made up of pan-shaped members each having a turned-up edge at three sides and an overlapping formation where they meet, as most clearly indicated at 104 in Fig. 2. When the said gates 96, 97 are closed, all light is excluded from the sensitized film material.

Supported between the camera body or housing 20 and the lens cone member 23 is the capping gate support member or aperture plate 105, as clearly shown in Figs. 2 and 3. The said plate 105 has a downwardly extending box-like formation on all four sides, as indicated at 106.

This forms a light-lock between the lens cone member 23 and the aperture plate or support member 105, and formed on the upper side of such capping gate plate is a second box-like formation or flange extending upwardly on all four sides and engaging the inner walls of the camera body or housing 20, as indicated at 107. Such structure forms a light-lock between the camera body or housing 20 and the capping gate support member or plate 105.

On two sides of the box-like flange or formation 106 are formed bosses 108, 108 for supporting said shafts 98, 99. In the capping gate support member or plate 105 is formed an opening having a downwardly extending lip indicated at 109, and it is over such lip formation that the capping gates 96, 97 are closed to exclude light from the sensitized film material when the said capping gates are in the position shown in Fig. 2.

Fitted to said shafts 98, 99 and securely keyed thereto are the hinged members 100, 101 previously referred to, and said capping gates 96, 97 are attached to the said hinge members by screws 96a, 96a and 97a, 97a, respectively, shown in Fig. 3. Said hinge members 100 and 101 are also provided with crank formations 110, 110, shown in dotted lines in Figs. 3 and 6. Fitted to the said crank members 110, 110 by means of shoulder rivets are link-like connecting members 111, 111 attached to capping gate actuating disk 112.

When the shutter is released by means of the shutter release lever or trigger 40, the said actuating disk 112 is caused to rotate in a manner subsequently described. The capping gates 96, 97 are caused to rotate on shafts 98, 99, respectively, through said hinge members 100, 101, causing said capping gates 96, 97 to be opened. The said capping gates are shown in fully opened condition in Fig. 16. When pressure upon the shutter release lever or trigger 40 is relieved, the capping gates 96, 97 are caused to close by means of the springs 102, 103 respectively.

Riding on the hinge members 100, 101, when the capping gates 96, 97 are in closed position, are pressure pad lifting members 113, 113 provided with reduced diameters at either end and fitted into holes 114, 114 of the capping gate support member or plate 105, and fitted into holes 115, 115 in the camera body or housing 20, and also fitted into shallow holes or indentations 116, 116 of the pressure pad 84.

Referring to Figs. 4 and 5, showing the construction and position of the shutter curtain rollers, the shutter curtain and the idler rollers, it will be noted that the shutter curtain rewind roller is represented at 117, the shutter rewind roller shaft at 118, and the shutter curtain at 119, as most clearly shown in Fig. 4, where it is represented as provided with slots or apertures 120, 121, 122. The curtain idler is shown at 123 in Fig. 2 and a second curtain idler on the opposite side of the exposure aperture is shown at 124. The curtain tension roller is shown at 125, the curtain tension roller shaft at 126, and the curtain tension roller spring at 127.

Referring to Fig. 5, the shutter compartment of the camera body or housing 20 is made up of four walls, namely, the right-hand wall 128, the back wall 129, the left-hand wall 130 and the front wall 131. The shutter curtain rewind roller 117 is provided at either end with bushings 132, 133 pinned to the shutter curtain rewind roller and shaft by means of pins 134, 135, respectively. The left-hand end of the shutter curtain shaft 118 (viewing Fig. 5) is fitted into a bearing 136 having a dust cap 136a and held to the camera wall 130 by screws 137, 137. Onto the right-hand end of the shaft 118 is keyed a curtain roller rewind gear 138, securely held thereto by a locking screw 139. Into the wall 128 is fitted a bushing 140 providing a bearing for the hub of the rewind gear 138, and thus providing a bearing for the curtain roller 117, which is spaced from the said wall 128 by means of a washer 141 and from the wall 130 by a washer 142.

The said second idler roller 124 is fitted to turn freely on pin 143 attached to the said wall 130 in any suitable manner. The opposite end of said second curtain idler 124 is supported on a pivot screw 145 threaded into the wall 128. The curtain tension roller 125 is provided with a bushing 146 on its left-hand end, securely held thereto, so as to turn therewith, but it has a central hole or bearing through which the shaft 126 is free to rotate. The opposite end of the tension roller 125 is provided with a bushing 147 securely held to the tension roller 125 and having a central hole or bearing so as to turn freely on the shaft 126. The left-hand end of said shaft 126 is supported in a bearing member 148 having a dust cap 148a held to the camera wall 130 by screws 149, 149. The opposite end of the tension roller shaft 126 is supported in a bearing 150 fitted into the wall 128. The right-hand end of said shaft 126 is provided with flats, shown in dotted lines in Fig. 6, to which is fitted a notch plate 151 held to the said shaft 126 by screws 152. The spring 127 is anchored to the said shaft 126 on its right-hand end (viewing Fig. 5) by passing through a hole 153 in said shaft 126, and the opposite end of said spring 127 is anchored in a slot in bushing 146, as clearly shown in Fig. 5.

In order to increase the tension of spring 126, the screws 154, 154 are removed and the notches 155 of plate 151 are engaged by a suitable tool and turned in a contraclockwise direction, viewing Fig. 6, then said screws are replaced, properly aligning notches 155, so that the screw heads will engage said notches. This supplies very simple means for applying predetermined tension upon the curtain tension roller, since the tool for adjusting the tension can be made with a clutch that will slip when a given or predetermined tension has been reached.

There will next be described the mechanism that controls the rewinding of the shutter curtain and moves a new area of the sensitized film material before the exposure opening, and also controls the releasing of the shutter for making an exposure, and for this purpose we will refer to Figs. 6 and 13 particularly.

Referring first and more particularly to Figs. 6, 7 and 8, the shutter used in the herein disclosed camera is of the so-called multiple-aperture type, by which is meant a curtain having a separate aperture for each exposure speed. When using such curtain, it is desirable to select some one of the several apertures, and after that aperture is selected, the same aperture will be used for all subsequent exposures until a different aperture is selected.

Referring to Figs. 6, 7, 9, 10, 11 and 12, the curtain roller rewind gear 138 meshes with shutter rewind gear 156 which is provided with a cylindrical hub 157 constituting also a pinion, and is fitted over a second cylindrical hub or sleeve 158 that extends from and has integral therewith a shutter release disk or member 159. Said hub or sleeve 158 is free to turn on the stud 160 that is provided with a cylindrical hub 161 and a spacing washer 162, both held to the inner wall 128 of the mechanism-housing by means of screws 163, 163. Said shutter release disk 159 is provided with two index holes 164, 164, and the shutter rewind gear 156 is provided with two pins 165, 165 for engaging the index holes 164, 164. In Fig. 9, the said pins 165, 165 are shown as engaged with the index holes 164, 164 and in Fig. 10 the said index pins are shown disengaged from the said index holes. The purpose of this structure is to provide means for disconnecting the shutter rewind gear 156 from the shutter release disk 159, when selecting a new curtain aperture. Said shutter release disk 159 is provided with a notch 166, shown in Fig. 12 in full lines and in Fig. 6 in dotted lines. Said notch 166 serves as means to hold the shutter curtain in a set condition when the curtain is fully wound, and it is engaged by a detent 167 of a shutter release lever 168 which is pivoted on a shoulder screw 169 threaded into a hub or support member 170 held to the mechanism-housing wall 128 by screws 171, 171. The shutter release lever 168 is caused to be turned in a contraclockwise direction by means of a spring 172, one end of which engages a hole 173 of the lever 168, the opposite end thereof engaging a circular groove in a spring retaining screw 174. Inasmuch as the curtain maintains a tension on the curtain roller 117, tending to cause it to turn in a contraclockwise direction, the shutter rewind gear 156 would be caused to turn in a clockwise direction, but is prevented from doing so inasmuch as the shutter release disk 159 is held from turning by the detent 167 of the lever 168 engaging the notch 166 of said shutter release disk 159.

In Fig. 6, the shutter is shown in a fully wound condition ready for making an exposure, the rewinding cycle having just been completed. In order to rewind the shutter and move a new area of sensitized film material to the exposure opening, a train of gears and a film feed clutch are provided. We will now trace such gear train from the shutter rewind gear 156 to the main operating gear and in so doing will refer to the same figures and also to Figs. 13 and 14.

Pivoted on a stud 175 is a rocker bar 176, shown in Fig. 7. On the right-hand end of such rocker bar 176 is carried an idler pinion or gear 177 held to and carried by said rocker arm 176 by a shoulder stud 178 riveted to the said rocker bar 176. The opposite end of the shoulder stud 178 is provided with an enlarged diameter 179 for retaining the gear 177, and a reduced diameter 180 which engages a slot 181 of the guide plate 182 (Fig. 6). The said guide plate 182 is held in the mechanism-housing by screws 183, 183. There is a further reduced diameter 184 on the shoulder stud 178, provided with a groove for attaching a spring 185.

Also carried on the said rocker arm 176, as shown in Fig. 7, etc., is an idler gear 186, by means of a shoulder stud 187 which has a suitable shoulder or flange for retaining said idler gear 186, and a reduced diameter extension 188, the purpose of the latter being to form an interlock that will be described particularly in that part of the specification addressed to the interlocks in detail.

As shown in Figs. 6, 7, 13, 16 and 20, mounted on the stud 175 is an idler gear 189 which meshes with a film feed gear 190. The said idler gear 189 and the rocker arm 176 are held to the stud 175 by means of a retaining washer 191 and a retaining screw 192. The stud 175 is provided with an enlarged diameter base, and is held to the mechanism-housing by means of screws 194, 194. The film feed gear 190 (Fig. 20) is free to rotate on a hub 195 of the ratchet wheel 196 fitted to the take-up spool shaft 76 and keyed thereto by means of flats 197 (Fig. 7). Keyed to said film feed gear 190, as shown in Figs. 6 and 7, is a spring clutch member 198 in frictional contact wtih ratchet wheel 196. The said film feed gear 190 and ratchet wheel 196 are held in position on the shaft 76 by means of a washer 199 and a locking screw 199a.

The ratchet wheel 196 is held from rotating in a contraclockwise direction when a predetermined amount of film has been fed as governed by the film measuring roll 71, by a rocker arm 200, shown in Fig. 6, etc. as having a pawl or dog 201 for engaging teeth in said ratchet wheel 196. Said rocker arm 200 is supported on a shoulder screw 202 threaded into a boss on the mechanism wall 128, and it is caused to turn in a clockwise direction under the influence of a spring 203, which has a hooked formation engaging the lower end of rocker arm 200, the other end being anchored on a screw 204 having a suitable groove to hold said spring in position.

As shown in Fig. 6, the film measuring roller 71 is provided with a gear 205 which meshes with an index gear 206 attached to the mechanism-housing by a screw 206a, and an index plate 207 having a notch 208 is attached to said index gear 206 by screws 209. The lower end of the rocker arm 200 is provided with a reverse L-shaped formation, indicated at 210, for engaging the notch 208 of the index plate 207 each time the notch 208 reaches the formation 210 as the index plate 207 is revolved by the gear 206.

When the pawl or dog 201 engages the teeth of the ratchet wheel 196, the film take-up spool is prevented from turning, but the film feed gear 190 can continue to revolve because of the friction clutch previously described. When the pawl or dog 201 is withdrawn from the teeth of the ratchet wheel 196, the take-up spool is driven by said film feed gear 190 through the clutch member 198, until the bent-over end 210 drops into the notch 208 of the index plate 207.

The gear ratio between gears 205 and 206 is such that when sufficient film is measured off by the film measuring roller 71 to bring a new supply of film before the exposure opening, the index plate 207 will have made one complete revolution. The dog or pawl 201 is withdrawn from the ratchet teeth of the ratchet wheel 196 by the action of the shutter running down, as will be later fully explained.

As best shown in Fig. 6, also meshing with the film feed gear 190 is a main driving gear 211 that is carried on a suitable stud whereon is a ratchet wheel 215 which is driven by the main driving gear 211 by means of keys 216, 216 engaging keyways 217, 217 of the main driving gear 211. Attached to the latter and operating therewith is a pinion 218, shown in Fig. 6.

The ratchet wheel 215, the main driving gear 211 and the pinion 218 are held onto said stud by means of a large head screw 219, and the said main driving gear 211 is prevented from turning in a contraclockwise direction by means of a pawl 220 engaging teeth in the ratchet wheel 215, the said pawl 220 being mounted on a stud itself mounted on the back wall of the mechanism-housing, and being held in place by a large head screw 221. The pawl 220 is caused to be rotated in a clockwise direction by means of a spring 222, one end of which has a hooked formation engaging the upper end of the said pawl 220. The opposite end of the spring 222 is held in place by a screw 223 having a suitable groove therefor.

It has previously been explained how film is wound on the take-up spool 62 by rotation of the film feed gear 190 through the clutch member 198, ratchet wheel 196 and the shaft 76. It has also been explained that for each exposure the index gear 206 makes one complete revolution and then stops, thereby preventing further winding of the film until a second exposure is made.

Again referring to Figs. 6 and 7 and also to Fig. 13, wherein the structure is shown in a fully wound condition, film has been wound on the take-up spool 62 and is prevented from being further wound by pawl 201 engaging ratchet wheel 196, this all being accomplished by the rotation of the main driving gear 211 turning through one revolution, thereby driving the shutter rewind gear 156 in the manner previously described. The main driving gear 211 may have a crank attached in place of the pinion 218 and in order to simplify the description of the operation, it will be assumed that means is provided to drive the main driving gear 211 through a cycle of one revolution for each exposure, and we will now describe the reciprocating and driving means for the reciprocating rewinding and the interlocking means provided therefor, after having fully explained the shutter operation and the film winding operation in its simpler form.

As shown in Fig. 6, the shutter rewind gear 156 is prevented from turning by the pawl or detent 167 of the shutter release lever 168, and because the gear 177 is in mesh with gear 156, and inasmuch as the gear train can move only in one direction, due to ratchet wheel 215 and pawl 220, the gear 177 being held in mesh with the said shutter rewind gear 156 by means of spring 185 attached to the stud 184 and a screw 233 threaded into the mechanism housing. To lock securely the gear 177 in mesh with the shutter rewind gear 156, there is provided a rocker arm lock lever 234 pivoted on a shoulder screw 235 and caused to turn in a clockwise direction by means of a spring 236 hooked to the lever 234. By a hole 237 the opposite end of said spring 236 is connected to a stud 238 threaded into the mechanism-housing. The upper portion of the rocker arm member 234 is of a modified C formation having a hook 239 which engages the stud 188 of the rocker arm 176, thus holding the gear 177 securely in mesh with the shutter rewind gear 156.

As best shown in Figs. 23, 24 and 25, when the shutter release lever or trigger 40, positioned as shown in Fig. 13, is caused to turn in a clockwise direction, the gear 240 will also be caused to turn in a clockwise direction. The said shutter release lever or trigger 40 and the gear 240 are shown held together by means of rivets 241, 241 and by a special pin 242 having its end cut away as shown in Fig. 24, which is part of the interlock to be presently described.

The gear 240 and the shutter release lever or trigger 40 are mounted on the inner wall of the mechanism-housing by means of a shoulder rivet 243, and to one wall of the lens cone member 23 is fitted a bushing 244 into which a shaft 245 is free to rotate, as shown in Fig. 25. To one end of the shaft 245 and integral therewith is the capping gate operating or actuating disk 112, previously referred to, and onto the opposite end is keyed a gear 246. Since the gears 240 and 246 are constantly in mesh, when the shutter release lever or trigger 40 is moved in a clockwise direction, the gear 246 will be turned in a contraclockwise direction, thus operating the actuating disk 112 and the capping gates 96, 97 through connecting arms 111 and 111a and shoulder rivets 247, 248.

The opposite movement of the shutter release lever or trigger 40 (that is, in a contraclockwise direction) results in closing said capping gates through movement of the actuating disk 112, and such closing movement of the capping gates is timed in operation with, and is operatively connected in action to, the shutter rewinding means. Through the described interlocks for the shutter operating handle 39 and the shutter release lever or trigger 40, the capping gates are actually locked closed when closed and are locked open when open.

The shoulder rivet 248 is provided with a cylindrical extension 249 that engages the shutter operating arm or lever 250 which, as best shown in Fig. 8, is attached to a shaft 251 that rides in a bushing 252 fitted into a boss 253 on the mechanism-housing wall 128. Said shaft 251 is provided with suitable flats to which is keyed a crank member 254 held to said shaft 251 by means of a locking screw 255, shown also in Fig. 13, etc. Free to turn on said shaft 251 is a rewind interlock member 256, shown also in Figs. 13, 14, 15, 16, 18 and 19, and film ratchet release member 257. As the shutter release lever or trigger 40 is rotated in a clockwise direction, and the actuating disk 112 is rotated in a contraclockwise direction, this causes the opening of capping gates 96, 97, as previously referred to, and causes the shutter operating arm 250 and the shaft 251 and the crank member 254 to be rotated in a clockwise direction, as indicated in Figure 13.

As the crank member 254 is rotated in a clockwise direction, an extending finger 258 of the lever 234, as shown in Figs. 13 and 16, is engaged by the crank member 254, and the lever 234 is caused to be turned in a contraclockwise direction on the shoulder screw 235, thus disengaging the hook 239 from the pin 188. The rocker arm 176 is now free to be moved upward to disengage the gear 157 from the shutter rewind gear 156, as indicated in Fig. 16. The crank member 254 is provided with a shoulder rivet 259 riding in a groove or slot 260 of link 261. The groove 260 provides a certain amount of lost motion in the travel or turning of the crank member 254, for the purpose of allowing the capping gates 96, 97 to be partially opened and at the same time to disconnect the hook 239 from the pin 188 before the shutter is released.

As the shutter release lever or trigger 40 continues to move, the capping gates 96 and 97 continue to open until they reach the position shown in Fig. 16, and the link 261 which is connected to rocker arm 176 by means of a shoulder screw 262 will cause the rocker arm 176 to be rotated about the screw 175 until the gear 177 is fully disengaged from the shutter rewind gear 156, as shown in Fig. 16. Attached to the rocker arm 176 is a hook-shaped member 263 having a slot 264 and a hook 265, and it is held to the rocker arm 176 by screws 266, 266. The purpose of the hook-shaped member 263 is to engage the end of the shutter release lever 168 by means of the hook 265, thus disengaging the detent 167 from the notch 166 of the disk 159. The mechanism will now be in the position shown in Fig. 16, wherein the shutter curtain has run all the way down and the exposure is completed.

As best shown in Figs. 11 and 13, the disk 159 is provided with a pin 267, the purpose whereof is to operate the film measuring device and to limit the motion or travel of the plate or disk 159 and the shutter rewind gear 156 when the shutter curtain reaches the end of its travel. The said pin 267 is also used for operating one of the interlocks, as will be described presently.

Still referring to Fig. 16 and also to Fig. 18, as the curtain roller is turned in a contraclockwise direction under the influence of the curtain tension roller 125, the shutter rewind gear 156, disk 159 and pin 267 turn in a clockwise direction until said pin 267 engages the interlock member or lever 256 and the ratchet release member 257, which are caused to turn on the shaft 251 until said member or lever 256 is stopped by a stopping block 268. The said member or lever 256 is provided with a laterally extending arm 270 having an upturned end 271, to which is attached a spring 272, the other end whereof is hooked to a pin 273 threaded into the mechanism-housing wall 128. The ratchet release member 257 is pivoted on the shaft 251 as previously explained and is of a generally rectangular shape. The upper right-hand corner 274 thereof is cut off to form a cam face to be operated upon by said pin 267 and has riveted thereto by means of a shoulder rivet 275 a rocker arm operating link 276, the opposite end whereof is connected to rocker arm 200 by means of shoulder rivets 277.

In Fig. 16, the mechanism is shown in the condition when the shutter curtain has run all the way down. Therein the pin 267 has contacted with the cam face 274 of the ratchet release member 257 and has caused said ratchet release member 257 to be rotated in a contraclockwise direction, carrying with it the rocker arm connecting link 276, thus causing the rocker arm 200 to be turned in a contraclockwise direction against spring 203, thereby disengaging pawl 201 from the teeth of ratchet wheel 196. When the shutter release lever or trigger 40 is released, the capping gates 96 and 97 are caused to be closed in a manner previously described, and this action will cause the actuating disk 112 to be rotated in a clockwise direction, allowing the shutter operating arm or lever 250 to be turned in a contraclockwise direction, also turning the lever 254 in a contraclockwise direction, thus allowing rocker arm 176 to turn in a clockwise direction and permitting gear 177 and shutter rewind gear 156 again to become engaged under the influence of spring 185. The shutter can now be rewound, and since the capping gates 96 and 97 are closed, the sensitized material will not be exposed when the shutter aperture is wound past the exposure opening. Thus the closing movement of the capping gates is timed in operation with, and is operatively connected in action to, the shutter rewind means. Rewinding of the shutter is now started and a sufficient length of unexposed film is fed before the exposure aperture by turning the main driving gear 211 in a clockwise direction until a notch 166 of the disk 159 is engaged by the detent 167.

Referring to Fig. 20, the shutter rewind gear 156 has started to turn and has turned approximately one half a revolution. The film feed gear 190 has also been turned, causing the film spool 62 to be rotated through the clutch member as previously described, and the ratchet wheel 196 is caused to turn in a contraclockwise direction. As the film 89 passes over the film measuring roller 71, the gear 205 is caused to turn in a clockwise direction, turning the index gear 206 and the index plate 207 in a contraclockwise direction until a sufficient amount of film has passed over the film measuring roller 71 to provide an unexposed area of sensitized material before the exposure opening. The notch 208 of said index plate 207 will then have reached the bent-over end 210 of the rocker arm 200 which will now be caused to turn in a clockwise direction by spring 203, until the pawl 201 engages the teeth of the ratchet wheel 196, thus stopping the spool 62 from further turning. However, the main driving gear 211 is continued in motion until the notch 166 of the disk 159 is engaged by the detent 167 of the lever 168. The mechanism then will be in the condition shown in Fig. 6.

It will be noted that as shutter rewind gear 156 was caused to be turned in a contraclockwise direction to rewind the shutter curtain, as illustrated in Fig. 20, the pin 267 was carried away from the cam face 274 of the ratchet release member 257, thus permitting the said ratchet release member 257 to be moved in a clockwise direction, and permitting the rocker arm 200 to turn in a clockwise direction until the bent-over end 210 engages the outer surface of the index member 207.

In order to select a different aperture or a different shutter speed, we proceed as follows:

Referring to Figs. 9 and 10, the shutter rewind gear 156 has attached thereto, as stated, the pinion 157 having integral therewith a sleeve 157a, and to the right hand end of said sleeve 157a, viewing Fig. 9, is attached a threaded bushing 278 which has a press or shrink fit onto sleeve 157a. Threaded to the bushing 278 is the shutter setting knob 37 locked in place by the lock nut 279. The shutter setting knob 37 is of a hollow cylindrical construction providing a space for the knob return coil spring 280, one end of which rests on the inner bottom wall of the said knob 37 and the other end thereof rests against a spring retaining washer 281 held in place by a cover plate 282, which is fitted to the shaft 160 provided on its right-hand end with two flats for keying the cover plate 282, which with the washer 281 are held to the shaft 160 by a screw 283. The spring 280 tends to keep the shutter rewind gear 156 in contact with the disk 159, thus engaging the pins 165, 165, with the holes 164, 164 of said disk 159.

When the shutter setting knob 37 is moved to the right, as in Fig. 10, the shutter rewind gear 156 and pinion 157 are also moved to the right, disengaging pins 165, 165 of said shutter rewind gear 156 from holes 164, 164 of disk 159, and the gear teeth of said shutter rewind gear 156 are disengaged from the teeth of the rewinding gear 177. The said shutter rewind gear 156 can now be turned to select a different shutter aperture, but said disk 159 is held stationary because the notch 166 of disk 159 is engaged by the detent 167 of the shutter release lever 168.

Referring particularly to Fig. 27 and also to Fig. 4, in order to provide means for indicating the position of the shutter curtain with respect to its several apertures, an index gear 284 is mounted on the mechanism plate 43 by a large head screw 285 and is free to turn thereon. The said index gear 284 is in mesh with the pinion 157. When the shutter is fully wound ready for exposure, the shutter setting or speed can be read in the window 42 of the index plate 286 mounted on the cover 43 by means of screws 287, 287.

In Fig. 27 the camera is set for a speed of 1/600 which corresponds to curtain aperture 120 of the curtain 119, shown in Fig. 4. If a shutter speed of 1/300 is desired, the shutter setting knob 37 is moved to the right, viewing Fig. 10, and turned in a clockwise direction until the numeral 300 appears in the window 42 of the index plate 286. If a shutter speed of 1/150 is desired, the shutter setting knob 37 is moved to the right and turned in a clockwise direction until the number 150 appears in said window, and if an indicated speed is 1/150 and a shutter speed of 1/600 is desired, the shutter setting knob 37 is turned to the right, viewing Fig. 10 in a contraclockwise direction until the numeral 600 appears in said window 42, as indicated in Fig. 27.

Means are provided to prevent over movement of the shutter curtain by the shutter curtain knob 37. Otherwise accidents would occur, as, for example, if the shutter were set for 1/600 and it was desired to change the shutter speed and said shutter setting knob 37 were turned in a contraclockwise direction. In such event, the curtain 119 would be torn loose from the curtain roller 117, and if, when a speed of 1/150 was indicated and the shutter setting knob 37 was turned in a clockwise direction, the curtain 119 would be caused to be wound up on the curtain roller 117 in the opposite (that is, in the wrong) direction. Therefore, in order to limit the motion of the shutter setting knob 37 when changing shutter speed and so as not to interfere with the turning of shutter rewind gear 156 when the shutter is being operated, there is provided interlocking means for engaging pin 288 of the index gear 284, and this mechanism will now be described.

Referring to Fig. 6, there is attached to mechanism-housing wall 128 a stud 289 having an enlarged base 290 held to the inner wall of the mechanism-housing by means of screws 291, 291. The stud 289 is provided with a central slot 292, and over said stud, as shown in Figs. 9 and 10, is fitted a housing 293 having an enlarged diameter 294. Attached thereto is a detent plate 295 by means of rivets 296, 296, as best shown in Fig. 13. Said detent plate 295 is provided with a central key member 297 (Fig. 13) fitting into the slot 292 of the stud 289 to prevent the detent plate 295 from turning on said stud 289. Said detent plate 295 can be moved to the right or to the left, viewing Figs. 9 and 10. It is caused to be moved to the left, viewing Fig. 9, by means of spring 298 held to the cover 43 by means of rivets 299, 299.

When the shutter is in a normal position (that is, when it is ready for making an exposure) the detent plate 295 with detent finger 300 is held out of engagement with the pin 288. When the shutter speed control or setting knob 37 is moved to the right carrying with it the shutter rewind gear 156, the enlarged diameter 294 of the bushing 293 and the detent plate 295 with the detent finger 300 are caused to be moved to the right against the spring 298. This action disengages the shutter rewind gear 156 from the winding gear or pinion 177 and places the detent finger 300 in position to be engaged by the pin 288, if said shutter speed control or setting knob 37 is turned too far in either direction. This definitely prevents the making of an improper adjustment for shutter speed.

It will be apparent that the only time that a correct indication of shutter speeds can be obtained is when the shutter is rewound and ready to make an exposure. In order to prevent anyone from trying to change shutter speeds when the curtain is run down, there is provided an interlock operated by rewind interlock member 256 previously referred to, and which rewind interlock member 256 is, as has been stated, caused to turn in a clockwise direction by spring 272 and in a contraclockwise direction by pin 267 of the shutter release disk 159, when the shutter curtain is run all the way down.

Referring particularly to Figs. 6, 16, 17 and 18, said rewind interlock member 256 has, as already described, a laterally extending arm 270 and a vertical projection 271, and it also has a bent-over member 301. When said rewind interlock member 256 is caused to be moved in a contraclockwise direction under the influence of pin 267, the member 301 overlies shutter rewind gear 156, clearly shown in Figs. 16 and 17, thereby preventing the shutter setting knob 37 from being moved to the right to change the shutter curtain relationship with respect to the shutter release disk 159.

We will next describe the rewinding device, which has a to and fro motion, preferably oscillatory, but which may be reciprocatory, and for that purpose will refer to Figs. 8, 21, 22 and 28. Meshing with the pinion 218 is a gear 302 constituting the free running member of an over-running clutch, best shown in Figs. 8 and 28. Said clutch is made up of the outer ring gear 302, previously referred to, and a driving member 303 having notches 304, 304 to recive rollers 305 that are thrust forward, or in a clockwise direction (viewing Fig. 28) by springs 306, 306. On either side of the driving member 303 are guide plates 307, 308, shown in section in Fig. 8. The guide plate 308 is provided with a drive member 309 having notches 310, 310 (Fig. 28). The driving member 303 and the guide plates 307, 308 are held together by means of rivets 311, 311.

The assembly made up of driving member 303 and guide plates 307 and 308, which carries outer ring gear 302, is fitted to a bushing 312 of a cylindrical structure having an enlarged flange 313 provided with a groove 314 semicircular in shape and with a notch 315. The purpose of groove 314 is to provide a limit of motion for the bushing 312 in a rotary direction, co-acting with head screw 320a, shown in Fig. 22, and the notch is for the purpose of preventing the bushing 312 from rotating at certain times. The opposite end of the bushing 312 is provided with flats 316, 316 that are fitted into a suitable hole in the guide plate 308. The driving member 303 and the guide plate 307 are provided with suitable holes to fit over the body of the bushing 312, which rides on a pivot member 317 having an enlarged diameter flange 318 and an extending dowel 319 (Fig. 8). The pivot member 317 is fitted to the mechanism wall 128 and is held thereto by means of screws 320, 320 and 320a. Also fitted to the bushing 312 (as shown in Fig. 21) and free to rotate thereon, is a trigger interlock member 321 having a laterally extending arm 322 to which is attached a spring 323, the opposite end whereof is attached to a pin 324 threaded into the mechanism-housing wall 128. Said trigger interlock member 321 is provided with a hook-shaped formation 325 for engaging the pin 342 and a laterally extending arm 326 for engaging a pin 327 of the rewind interlock member 256. The trigger interlock member 321 is kept in proper spaced relation between flange 313 and guide plate 207 by spacing pins 328, 328, shown in Fig. 22.

Referring particularly to Figs. 8, 27 and 28, the bushing 312 and the clutch assembly are held to the pivot member 317 by means of a washer 329 and a large head screw 330 threaded in the pivot member 317. For driving the gear 302 there is provided the shutter handle or operating member 39 (shown in many figures of the drawings) which is made up of a dog plate 331 (Fig. 8) having interengaging tangs to fit slots 310 of the drive member 309, as shown in Fig. 28, and a spacer 332 that is fitted between the dog plate 331 of the shutter handle or operating member 39, and is held into the assembly by means of rivets 333, 333. The shutter handle or operating member driving assembly made up of the said parts is held to and is supported on the camera cover 43 by semicircular disk-like plates 334, 334, which are attached to the cover 34 by means of screws 335, 335.

It will be noted that when the shutter handle or operating member 39 is oscillated, the clutch drive member 303 and the bushing 312 will also oscillate on the pivot member 317, but the outer ring gear 302 will be driven only in a contraclockwise direction by clutch members 305 in a manner well known in the art. Said outer ring gear 302, which is in mesh with pinion 218 (Fig. 6) cannot be turned in a clockwise direction because of ratchet wheel 215 and pawl 220, previously referred to. Said clutch driving member 303 and the said bushing 312 are limited in motion to approximately 120° by means of a stop pin which is formed by the enlarged head-on screw riding in the groove 314 of the flange 313. Therefore, the shutter handle or operating member 39 can be oscillated through an arc of 120° only, and when said handle or member 39 is operated in a contraclockwise direction, the main driving gear 211 will be caused to turn a distance sufficient to turn the shutter rewind gear 156 that part of a revolution necessary completely to rewind the shutter curtain; and when the shutter curtain is fully rewound, it is stopped from further motion by detent 167 engaging the notch 166 of the shutter release disk 159 (Fig. 6, etc.). However, a series of movements to and fro of less than 120° can also be used for rewinding the shutter curtain. When the latter is fully wound, said shutter handle or operating member 39 can no longer be operated in a contraclockwise direction, thus said handle or member must be returned to the starting position, as shown in Fig. 27, before the shutter curtain can be released.

When said shutter handle or operating member 39 is returned to its starting position by turning it in a clockwise direction, the pin 327 of the rewind interlock member 256 will engage the notch 315 of the flange 313 and thus prevent further rewinding until the pin 327 has been withdrawn, as indicated in Figs. 6, 13 and 26. As the shutter is released and the curtain is allowed to run down, the shutter rewind gear 156 turns in a clockwise direction, carrying with it pin 267 until it is stopped against the upper end of the rewind interlock member 256, as shown in Figs. 16 and 18. This will cause said rewind interlock member 256 to be rotated in a contraclockwise direction on shaft 251 and against the tension of the spring 272. The parts of the interlock will now be in the position shown in Figs. 16, 18, 20 and 21. In the upper end of the rewind interlock member 256 is a notch 336 (Figs. 16 and 18) which is engaged by a pin 337 of the spring member 338 when the interlock has been moved to the position shown in Fig. 18. The pin 327 will be held out of engagement with the notch 315 and the shutter handle or operating member 39 can now be operated.

The said pin 327 will be held out of engagement with the notch 315 until the shutter is again rewound. As the shutter is rewound the shutter rewind gear 156 will be turned in a contraclockwise direction until the shutter is fully rewound and the notch 166 is engaged by the detent 167. The pin 267 will now be in the position shown in Fig. 26, overlying the bent-up end 339 of the spring 338 carrying pin 337. This will cause said pin 337 to be disengaged from the notch 336 of the rewind interlock member 256 and allow the said rewind interlock member 256 to be turned in a clockwise direction by means of the spring 272, so as again to engage the notch 215 of the flange 313 when the shutter handle or operating member 39 has reached the limit of motion in a clockwise direction.

The spring 338 is fitted into a recess in the wall 128 of the mechanism-housing and is held to the said mechanism-housing by screws 163, 163, previously referred to as holding the stud 160 to the mechanism-housing wall.

It is very important to have the shutter release lever or trigger 40 locked after each exposure and until a new supply of film has been moved into position before the exposure opening. We have accomplished this in the following manner.

Referring to Fig. 6, where the mechanism is shown in condition for making an exposure (that is, the shutter being fully wound and the handle 35 being locked), and referring also to Figs. 16, 20 and 21, the gear 240 is provided, as previously stated, with a pin 242 passing through an elongated slot 340 in the mechanism-housing wall. The trigger interlock member 321 has been rotated in a clockwise direction under the influence of pin 327 and finger 326, thus moving the hook 325 out of the path of said pin 242. When the shutter release lever or trigger 40 is operated in a clockwise direction, moving the gear 240 and pin 242, the said pin 242 will have passed over the end of said hook 325, as indicated in Fig. 13. As the movement of said shutter release lever or trigger 40 is continued in a clockwise direction, the shutter is thereby permitted to operate. The mechanism will then be in the condition shown in Fig. 16, wherein the shutter has run all the way down. The pin 327 will be rotated in a contraclockwise direction and away from the finger 326, and as the shutter trigger 40 is released and allowed to turn in a contraclockwise direction, the trigger interlock member 321 will be caused to rotate in a contraclockwise direction allowing the hook 325 to be placed in the path of pin 242, thus preventing a second operation of the shutter release lever or trigger 40 until the shutter has been rewound. The shutter trigger interlock mechanism is now in the position shown in Fig. 21, wherein said shutter release lever or trigger 40 is locked and the shutter rewind mechanism is unlocked and the shutter has been partially rewound, as shown in Fig. 20. When fully rewound, the mechanism will be in the condition shown in Fig. 6, ready for a second exposure.

*Résumé of the movement of the two co-acting interlocks*

The following is a résumé of the operation of the shutter-operating or rewind-handle interlock and the shutter release lever interlock, the part 39 being the shutter operating handle and the part 40 being the shutter release lever or trigger.

In normal operation, the said operating handle 39 is first moved in a contraclockwise direction viewing Fig. 1, through an arc of approximately 120° to the position shown in dotted lines, Fig. 1. This motion causes film to be fed for the next exposure and the shutter curtain to be rewound in the manner fully described hereinbefore. Said operating handle 39 is then returned to the position shown in full lines in Fig. 1, and it becomes locked in this position, as shown in Fig. 26, by reason of the pin 327 engaging the notch 315 of the flange 313 integral with the hub 312 connected to the handle 39, as already described. Said pin 327 is attached to the rewind interlock member or rocker arm 256 and is caused to engage the notch 315 by said rewind interlock member 256 being moved in a clockwise direction under the influence of spring 272. Said shutter operating handle 39 can now no longer be operated until after the shutter has been released, but said shutter release lever or trigger 40 can now be operated for releasing the shutter because the hook-shaped member 325 (Figs. 13, 16, 20 and 21, showing the different positions thereof) has been moved in a clockwise direction by the pin 327 acting on the extension 326 of the trigger locking member 321. Said hook-shaped member 325 will now be held in this position until the shutter curtain has run all the way down. The shutter release lever or trigger 40 is now operated, the pin 242 on the gear 240 will move in a clockwise direction in the opening 340 (viewing said figure) and said gear 240 will be rotated in a clockwise direction, thus operating the capping gate levers 250 and 254. This will cause the gear 177 to be disengaged from the shutter rewind gear 156 (Fig. 16), and a further movement in a clockwise direction of said gate lever 254 by said shutter release lever or trigger 40 will cause the dog 167 to be disengaged from the notch 166 of the disk 159. The shutter curtain will now run down, causing an exposure (Fig. 16). As the shutter rewind gear 156 turns in a clockwise direction, the rewind interlock member 256 will be contacted by the pin 267 on the disk 159, near the end of the travel of the shutter curtain, and said rewind interlock member 256 will be caused to be turned in a contraclockwise direction until it is stopped from further movement by the bumper plate 268. The pin 327 will be disengaged from the notch 315, thus unlocking the shutter operating handle 39 and allowing the trigger locking member 321 to turn in a contraclockwise direction under the influence of the spring 323, when said shutter lever or trigger 40 is released, thus placing the hook 325 in the path of the pin 242 (Fig. 21). This will prevent the operation of said shutter release lever or trigger 40.

The said rewind interlock member 256 is provided, as explained, with notch 336 engaged by the pin 337 of the spring member 339 (Fig. 18). Said pin 337 will prevent the rewind interlock member 256 from rotating until the shutter has been completely rewound, and when the shutter is completely rewound, the pin 267 will override said spring 339, causing it to be moved in a downward direction, thereby withdrawing the pin 337 from the notch 336 (Fig. 26), thus allowing the rewind interlock member 256 to be turned in a clockwise direction under the influence of spring 272, and said shutter operating handle 39 is again locked from further movement, and said shutter release lever or trigger 40 is unlocked because hook 325 has been turned in a clockwise direction by the pin 327 on the rewind interlock member 256 (Fig. 6). Said rewind interlock member 256 is provided with the extension 270 having the prolongation 301 that overlies shutter rewind gear 156 when the shutter curtain is in its run-down condition, thus preventing the shutter rewind gear 156 from being moved out of engagement with pins 165 of the disk 159, to prevent changing shutter speeds at this time.

It will be noted that when the shutter is in its fully rewound condition, the shutter operating handle 39 is locked in the normal position. Said prolongation 301 is in a position to be out of engagement with the shutter rewind gear 156, and the hook 325 is in a position to allow the pin 242 to be turned in a clockwise direction. When the shutter is in its run-down condition (best shown in Fig. 20), said prolongation 301 overlies the shutter rewind gear 156. The pin 327 is disengaged from the notch 315, and the hook 325 is in position to prevent the turning of the pin 242, and therefore the shutter operating handle 39 can be moved in a contraclockwise direction for rewinding the shutter, but the shutter release lever or trigger 40 cannot be operated, nor can the shutter rewind gear 156 be disengaged from the pins 165, 165 for changing the shutter speed setting.

In order to make wholly clear the operation and function of the lock for the release lever 40, it is pointed out that in reality said release lever 40 is not locked by its own movement directly, but it becomes locked because said release lever 40 releases the shutter, and it is the shutter itself that in reality locks the release lever 40 after the said shutter has run all the way down. If the shutter were prevented from running down by anything that served to hold the shutter curtain, said shutter release lever 40 would not be locked through the mere movement of said shutter release lever 40 to release the shutter curtain, but said release lever 40 would remain unlocked until the shutter curtain has been permitted to run all the way down.

This will be clear from a consideration of Fig. 6, particularly taken with Figs. 18 and 21. In Fig. 6, the shutter is shown as fully wound or tensioned ready for the making of an exposure and the operating handle 39 is locked through the fact that the pin 327 engages the notch 315 of the flange 313. The release lever 40 is at this time free to be operated because the projection 325 of the trigger interlock member 321 has been turned in a clockwise direction by the pin 327 of the lever 256 through the action of spring 272. The release lever 40 can now be turned in a clockwise direction for making an exposure, which movement of the release lever 40 will open the capping gates, disengage the gear 177 from the shutter rewind gear 156, and will withdraw the pawl 167 of the lever 165 from the notch 166, thus allowing the shutter to run down. The said shutter release lever 40 is not yet locked, nor does it become locked until the shutter rewind gear 156 runs all the way down and pin 267 operates lever 256, as indicated in Fig. 18, moving the pin 327 in a contraclockwise direction under the influence of the spring 323.

If the shutter release lever 40 is now released, it will be caused to turn in a contraclockwise direction, and when it has returned to its starting position, the projection 325 of the interlock member 321 will be in the position shown in Fig. 21, wherein the shutter release lever 40 will be prevented from rotating in a clockwise direction because the pin 342 will be engaged by the projection 325 of the trigger interlock member 321. Therefore a second operation of the shutter release lever 40 will be prevented until the shutter is again rewound, at which time the pin 267 will engage the spring 339, withdrawing the pin 337 from the notch 336 of the lever 256. This is best shown in Fig. 26. The lever 256 will now be allowed to turn in a clockwise direction through the action of spring 272, and the pin 327 will engage the notch 315 of the flange 313, thus preventing any movement of the shutter operating or rewind handle 39 until the shutter release lever 40 has again been operated and the shutter has run all the way down, thus withdrawing pin 327 from the notch 315 of the flange 313, and, of course, when the shutter operating or rewind lever 39 is locked, the shutter lever 40 is unlocked.

The rewind of the film or positioning of a new area of film for the next exposure has nothing to do directly with the locking or unlocking of the shutter release lever 40. Whenever the shutter is rewound, there is a new area of film fed into position, but actually the shutter release lever 40 is caused to be locked after the shutter has run all the way down, and by reason of such running down, and the shutter release lever 40 is released by the rewinding of the shutter curtain. This we believe to be wholly new in the art.

As hereinbefore set forth, the shutter operating handle 39 can be used for conditioning the camera for a second exposure by a series of strokes each shorter than 120°, due to the over-running clutch in the handle mechanism. When a sufficient number of these short strokes has been made fully to rewind the shutter, thus placing the shutter rewind gear 156 in the position shown in Fig. 6, said shutter operating handle 39 can no longer be moved in a contraclockwise direction; neither can the shutter release lever or trigger 40 be operated, because the locking member 321 is in such a position that the said hook 325 is in the path of the pin 242 on the gear 240. The pin 337 has been withdrawn from the notch 336, but the rewind interlock member 256 will not return to the position shown in Fig. 6 until said shutter operating handle 39 has been moved in a clockwise direction to place the notch 315 in position to be engaged by the pin 327, thus allowing the rewind interlock member 256 to be turned in a clockwise direction by the spring 272, thus rotating the trigger locking member 321 to such a position that the hook-shaped member 325 is out of the path of pin 242. The shutter release lever or trigger 40 can now be operated, and the shutter operating handle 39 is locked in the position shown in Fig. 1.

It will be clear from the foregoing description that we have provided in a photographic camera a shutter release lever 40 for the shutter, and means by movement of which the act of making the exposure by shutter-releasing movement of said release lever 40 thereupon locks said shutter release lever 40 after each exposure to prevent further movement of said shutter release lever 40 until, by said co-acting means, the shutter has been reset for the next exposure. The disclosed mechanism includes the rewind interlock member 256 for the means for setting the shutter, and the trigger interlock member 321 for the shutter release means, and means for rendering alternately effective each of said interlock members to perform its interlocking function, upon the completion of the acts accomplished respectively by (a) the means for setting the shutter, and (b)

the shutter releasing means. Thus there is provided means for rendering alternately effective each of the said interlock members and subsequently rendering in turn each of said interlock means ineffective. Each of said interlock members is rendered effective upon the accomplishment of the act performed by the functioning means for which such interlock member is provided, and when each of said interlock members is subsequently rendered ineffective by the accomplishment of the act performed by the other functioning means, for which the other interlock member is provided. Thus the disclosure includes means for rendering said interlock members reciprocally active and inactive in alternation.

It will be evident from the foregoing that the co-acting means for setting the shutter includes a shutter operating handle 39 with means combining therewith, by movement of which the act of setting the shutter thereupon locks said shutter operating handle 39 and effects the unlocking of said shutter release lever 40.

The camera is loaded with sensitized material as previously described and as indicated in Fig. 2. Enough film is wrapped on the take-up roller or spool 62 to ensure positive anchorage of the film spool core. The cover 21 is then placed on the camera and the indicator dial 41 (Fig. 27) is turned by the knob 226 until the notation is in line, the index pointer being clearly shown in said figure. The operating handle 39 is then moved in a forward direction as far as it will go and is then returned to the position shown in Fig. 27. A series of short strokes can be given until the said handle 39 can no longer be moved forward, being in the position shown in Fig. 27. The said handle 39 is then moved to the starting position and is automatically locked in that position in the manner hereinbefore fully described. As the shutter is rewound, the shutter release lever or trigger 40 is automatically unlocked.

Inasmuch as on the exposure counter dial 41 the numeral 1 is not yet lined up with the index mark, it is necessary to repeat the said cycle until the numeral 1 does so line up. The camera will then be ready for the making of the first exposure. Following each operation of the handle 39, it is necessary to release the shutter release lever or trigger 40 in order to allow the curtain to run down and to unlock the operating handle 39 for a second operation. Normally it requires about four of these cycles to bring the sensitized material before the exposure opening for the initial exposure. When the numeral 1 of the dial 41 and the operating handle 39 are in the position shown in Fig. 27, the camera will be ready for the making of a first exposure and the camera mechanism will be in the condition shown in Fig. 6.

In order to make an exposure, the shutter release lever or trigger 40 is moved in a clockwise direction until it reaches the end of its travel. The capping gates 96, 97 will then be opened and the shutter will be allowed to run down, making an exposure, and this action will unlock the operating handle 39 for rewinding film and for rewinding the shutter for a second exposure. In Fig. 16, the camera mechanism is shown with the shutter release lever or trigger 40 in the fully released position, the shutter curtain being run down all the way, the rewinding mechanism being unlocked and the film take-up spool ratchet disengaged. Upon the release of the said shutter release lever or trigger 40, the operating handle 39 can again be operated and the mechanism will again be in the condition shown in Fig. 20, where the shutter curtain is represented as partially rewound and the take-up spool 62 is winding film. When the shutter is fully rewound, the operating handle 39 can no longer be operated and the film spool will have previously been stopped from winding film.

All of the foregoing operations are entirely automatic, where so previously described, and it is impossible to operate the camera in any way excepting in the correct sequence of operation. This prevents double exposures and blank exposures. The shutter aperture can be changed only at the proper time—that is, when the shutter is in the fully rewound condition, thus preventing any injury to the shutter operating mechanism.

The herein disclosed camera can be operated by anyone within a minimum of instruction. The camera exactly as herein disclosed has been reduced to practice and the drawings accompanying and making a part of this application were made directly from one of several operating models that have been thoroughly tested by ourselves and also by members of the United States Army Air Corps.

Having thus described one illustrative embodiment of the invention, it is to be understood that although specific terms are employed, they are used in a generic and descriptive sense and not for purposes of limitation, the scope of the invention being set forth in the following claims.

We claim:

1. In a photographic camera having a single focal-plane shutter having different sized openings therein and means including a to and fro movable member for rewinding the same, and also including a shutter rewind gear 156, means cooperating with said gear for selecting a different sized shutter opening, a main driving gear 211 and driving gearing for said driving gear 211 including a ratchet wheel 215 co-axial with gear 211 and driven therewith, a gear 218 co-axial with and driving said gear 211, a pawl engaging said ratchet wheel 215 to prevent movement of said gear 211 in one direction, a gear 302 constituting the outer free running member of an overrunning clutch and meshing with gear 218, and a cooperating driving clutch member 303 co-axial with gear 302 and permitting winding movement of the shutter in the direction of turning movement of said gear 302, the manually operable shutter handle or operating member 39 mounted exteriorly of the camera casing and constituting said to and fro movable member for imparting winding movement to the shutter rewinding means, and means rendering it impossible to make a second operation of such manually operable shutter handle or operating member until after the shutter curtain has completed an exposure run.

2. In a photographic camera having a focal-plane shutter, means for rewinding said shutter, a manually operable shutter release lever 40 for releasing said focal plane shutter for making an exposure, movable interlock means for said release lever 40, moved into locking position only by, directly through and during exposure movement of said focal plane shutter as it completes an exposure-making run, following said release thereof, thereby locking said shutter release lever 40 against a second operation of said release lever in an exposure-making direction, and means to unlock said shutter release lever 40 when the said focal plane shutter has been completely rewound by said rewinding means.

3. A combination according to claim 2, but wherein the said means to lock the shutter release lever includes a trigger interlock member 321, and also includes a bushing whereon said trigger interlock member is free to turn, the latter having a hook 325, and a gear 240 having a pin 242 to be engaged by said hook.

4. A combination according to claim 2, but wherein the said means to lock the shutter release lever and cooperating with the structure recited includes a trigger interlock member 321, and wherein the means for rewinding the shutter includes a rewind interlock member 256, said trigger interlock member having a part to engage said rewind interlock member.

5. A combination in accordance with claim 2, but wherein there are provided a rewind gear 156, and a shutter release disk 159 co-axial therewith, the said rewind gear 156 having a notch 166 and a detent 167 to engage said notch when the shutter is fully rewound.

6. A combination according to claim 2, but wherein the said means to lock the shutter release lever and cooperating with the structure recited includes a trigger interlock member 321, and wherein the means for rewinding the shutter includes an interlock member 256 and a manually operable shutter handle member 39, and wherein, when the shutter handle operating member 39 is returned to starting position and the shutter has been restored to the position it had prior to making the last preceding exposure, means is provided to prevent further rewinding of the shutter.

7. A combination according to claim 2, but wherein the said means to lock the shutter release lever and cooperating with the structure recited includes a trigger interlock member 321, and wherein the means for rewinding the shutter includes an interlock member 256 and a manually operable shutter handle member 39, and wherein, when the shutter handle operating member 39 is returned to starting position and the shutter has been restored to the position it had prior to making the last preceding exposure, means is provided to prevent further rewinding of the shutter, said means to prevent further rewinding including a pin 327 of interlock member 256, and a bushing 312 having a flange 313 with a notch 315 to be engaged by said pin 327.

8. A combination according to claim 2, but wherein the said means to lock the shutter release lever and cooperating with the structure recited includes a trigger interlock member 321, and wherein the means for rewinding the shutter includes an interlock member 256 and a manually operable shutter handle member 39, and wherein, when the shutter handle operating member 39 is returned to starting position and the shutter has been restored to the position it had prior to making the last preceding exposure, means is provided to prevent further rewinding of the shutter, said means including a part having a projecting pin and a part having a notch to be engaged by said pin, the construction being such that the shutter handle 39 can be operated only when said pin is disengaged from said notch.

9. In a photographic camera having a focal-plane curtain shutter, shutter release means including a shutter release lever 40 for the shutter, a gear 240 carrying said release lever, a pair of pivoted capping gates to exclude light coming through the lense from the film when the shutter is being rewound, and operating connections from said gear 240 to said capping gates, whereby movement of said shutter release lever in one direction opens the capping gates means having a manually operable member cooperating through the shutter rewinding means and with the shutter release means rendering it impossible to make a second operation of the said manually operable member of the shutter release means until the shutter has been rewound by the rewinding means and also preventing rewinding of the shutter while the capping gates are open.

10. In a photographic camera having a focal-plane curtain shutter, a gear 240, shutter release means including a shutter release lever 40 carried by said gear 240, a pair of pivoted capping gates for excluding from the film the light entering through the lens when the shutter is being rewound, link-like connecting members 111, 111 operatively connected to said capping gates and operated by movement of said gear 240 means having a manually operable member cooperating through the shutter rewinding means and with the shutter release means rendering it impossible to make a second operation of the said manually operable member of the shutter release means until the shutter has been rewound by the rewinding means and also preventing rewinding of the shutter while the capping gates are open.

11. In a photographic camera having a focal-plane curtain shutter, a gear 240 having shutter release means including a shutter release lever 40, a pair of pivoted capping gates to exclude from the film the light entering through the lens when the shutter is being reset, a capping-gate actuating disk 112, links connecting said disk 112 to said capping gates, operating connections from said disk 112 to said gear 240 means having a manually operable member cooperating through the shutter rewinding means and with the shutter release means rendering it impossible to make a second operation of the said manually operable member of the shutter release means until the shutter has been rewound by the rewinding means and also preventing rewinding of the shutter while the capping gates are open.

12. In a photographic camera having a focal-plane curtain shutter, a gear 240 having shutter release means including a shutter release lever 40, a pair of pivoted capping gates to exclude from the film the light entering through the lens when the shutter is being rewound, a capping-gate actuating disk 112, a shaft 245 whereon said actuating disk is mounted, said shaft also having a gear 246 meshing with said gear 240 carrying said shutter release lever 40, whereby movement of said shutter release lever 40 in one direction opens said capping gates means having a manually operable member cooperating through the shutter rewinding means and with the shutter release means rendering it impossible to make a second operation of the said manually operable member of the shutter release means until the shutter has been rewound by the rewinding means and also preventing rewinding of the shutter while the capping gates are open.

13. In a photographic camera having a focal-plane curtain shutter, the shutter release means including a shutter release lever, means automatically to lock said shutter release lever after each exposure, shutter rewinding means including an operating handle 39, means automatically to lock said handle 39 upon rewinding said shutter, said two automatically acting lock means having parts interengaging with each other to effect the unlocking of one of said means by the locking action of the other, and vice versa, capping-gate means movably mounted in the camera to exclude from the film light entering through the lens when the shutter is being rewound, operating connections from said capping-gate means to said shutter release lever, whereby movement of said shutter release lever in the direction of the shutter operating movement opens the capping-gate means and means to close the capping gate means upon the movement of the shutter release lever in the opposite direction.

14. In a photographic camera, a shutter mechanism including a single shutter curtain having a plurality of different-area apertures therein, a shutter curtain rewind gear shaft 160 having a shutter rewind gear thereon, a shutter release disk, said shutter rewind gear and said disk being co-axial and disconnnectable to permit turning of said shutter rewind gear to select a different curtain aperture, and having interengaging formations, a shutter rewind interlock member having a part to be moved into such proximity to said shutter rewind gear and disk as to prevent them from being disconnected for selection of a different shutter curtain aperture, means for so moving said interlock member upon the running down of the shutter curtain, said disk having a peripheral notch to hold from movement the said shutter curtain when fully wound, and a shutter release lever having a detent to engage said peripheral notch.

15. In a photographic camera, a shutter mechanism including means for rewinding the shutter, and means providing for the selection of a different shutter aperture, such means including a shutter setting knob, and also including shutter rewind gear 156 to which said shutter setting knob is operatively connected, and having a laterally projecting pin, a disk 159 having a hole to receive said pin, gear 177 for turning said rewind gear in rewinding the shutter, and adapted to mesh with said shutter rewind gear 156, said gears being disengageable, a shutter rewind interlock member having a part to be moved into such proximity to said shutter rewind gear and disk as to prevent them from being disconnected for selection of a different shutter aperture, means for so moving said interlock member upon the running down of the shutter, and means to hold disk 159 stationary when said gears 156 and 177 are disengaged, and while said rewind gear 156 is being turned to select a different shutter exposure aperture.

16. In a photographic camera, a shutter mechanism including means for rewinding the shutter, and means providing for the selection of a different shutter aperture, such means including a shutter setting knob, and also including shutter rewind gear 156 to which said shutter setting knob is operatively connected, and having a laterally projecting pin, a disk 159 having a hole to receive said pin, gear 177 for turning said rewind gear in rewinding the shutter, and adapted to mesh with said shutter rewind gear 156, and means to hold disk 159 stationary, and while said rewind gear 156 is being turned to select a different shutter aperture, said shutter rewind gear 156 being slidable axially by manipulation of the shutter setting knob to disengage said gears 156 and 177 an interlock member having a part to be moved into such proximity to said shutter rewind gear as to prevent it from being slid axially, and means under the control of the means for rewinding the shutter to move said interlock member out of said proximity to the shutter rewind gear upon rewinding of the shutter.

17. In a photographic camera, a shutter mechanism including means for rewinding the shutter, and means providing for the selection of a different shutter aperture, such means including a shutter setting knob, and also including shutter rewind gear 156 to which said shutter setting knob is operatively connected, and having a laterally projecting pin, a disk 159 having a hole to receive said pin, gear 177 for turning said rewind gear in rewinding the shutter, and adapted to mesh with said shutter rewind gear 156, said gears being disengageable, means to hold disk 159 stationary when said gears 156 and 177 are disengaged, and while said shutter rewind gear 156 is being turned to select a different shutter aperture, an interlock member having a part to be moved into such proximity to said shutter rewind gear 156 as to prevent it from being turned to select a different curtain aperture, and means under the control of the means for rewinding the shutter to move said interlock member out of its said proximity to the shutter rewind gear upon rewinding of the shutter, and an index gear 284 in train with said shutter rewind gear 156, and an index plate 286 at said gear 156.

18. In a photographic camera, a shutter mechanism including means for rewinding the shutter, and means providing for the selection of a different shutter aperture, such means including a shutter setting knob, and also including shutter rewind gear 156 to which said shutter setting knob is operatively connected, and having a laterally projecting pin, a disk 159 having a hole to receive said pin, gear 177 for turning said rewind gear in rewinding the shutter, and adapted to mesh with said shutter rewind gear 156, said gears being disengageable, and means to hold disk 159 stationary when said gears 156 and 177 are disengaged and while said shutter rewind gear 156 is being turned to select a different shutter aperture, an interlock member having a part to be moved into such proximity to said shutter rewind gear 156 as to prevent it from being turned to select a different curtain aperture, and means under the control of the means for rewinding the shutter to move said interlock member out of its said proximity to the shutter rewind gear upon rewinding of the shutter, and means to prevent over-adjusting movement of the shutter by said shutter setting knob.

19. In a photographic camera, a shutter mechanism including means for rewinding the shutter, and means providing for the selection of a different shutter aperture, such means including a shutter setting knob, and also including shutter rewind gear 156 to which said shutter setting knob is operatviely connected, and having a laterally projecting pin, a disk 159 having a hole to receive said pin, gear 177 for turning said rewind gear in rewinding the shutter, and adapted to mesh with said shutter rewind gear 156, said gears being disengageable, means to hold disk 159 stationary when said gears 156 and 177 are disengaged and while said shutter rewind gear 156 is being turned to select a different shutter aperture, an interlock member having a part to be moved into such proximity to said shutter rewind gear 156 as to prevent it from being turned to select a different curtain aperture, and means under the control of the means for rewinding the shutter to move said interlock member out of its said proximity to the shutter rewind gear upon rewinding of the shutter, and means to prevent over-adjusting movement of the shutter by said shutter setting knob, said means including a movable detent plate 295 having a projection, an index gear 284 in train with said shutter rewind gear 156 and having a formation to be engaged by said projection of the index plate 295 to prevent undue movement.

20. In a photographic camera, a shutter having a plurality of shutter openings differing in size, shutter rewinding means including a manually operable member, means providing for the selection of a different shutter opening of said shutter from that last used, and means to prevent such change of shutter opening until after the manually operable member of the shutter rewinding means has been manually operated to rewind the shutter.

21. In a photographic camera, a shutter of the curtain type having a plurality of shutter openings differing in size, shutter rewinding means including a manually operable member, shutter release means including a shutter release lever and means rendering it impossible to make a second operation of the shutter release lever in a shutter releasing direction until the shutter has been rewound, means providing for the selection of a different shutter opening of the said curtain from that last used, and means to prevent such change of shutter opening until the shutter curtain has been restored by the manually operable member of the shutter rewinding means to the condition it had prior to the making of an exposure at the opening thereof last used.

22. A shutter mechanism as specified in claim 21, but wherein the means to prevent the change of shutter opening while the curtain is run down includes a shaft 251 having an interlock member 256 and a shutter rewind gear 156, said interlock member 256 having a formation which, in the movement of said interlock member, is itself so positioned as to prevent movement of said shutter rewind gear.

23. A shutter mechanism as specified in claim 21, but wherein the means to prevent the change of shutter opening while the curtain is run down includes a shaft 251 having an interlock member 256 and a shutter rewind gear 156, said interlock member 256 having a formation which, in the movement of said interlock member, is itself so positioned as to prevent movement of said shutter rewind gear, and also includes a shutter setting knob 37 held from turning by said interlock member.

24. In a photographic camera, a shutter having a plurality of shutter openings differing in size, thereby to secure a different shutter speed, means for rewinding the shutter, including a manually operable handle member 39, shutter release means including a manually operable release lever 40, means permitting the selection of a different shutter aperture of said shutter than that last used, so as to obtain a different shutter speed, and means to prevent such change of shutter speed until the shutter has been rewound by the manually operable handle member 39.

25. A shutter mechanism in accordance with claim 24, but wherein the shutter is of a single-curtain type.

26. Shutter mechanism for photographic cameras of the single-curtain type wherein a separate aperture is provided for each exposure speed, a housing for said shutter mechanism, a curtain-roller rewind gear 138, a shutter rewind gear 156 meshing therewith and having a hub 157 constituting a pinion, a second cylindrical hub 158 within said hub 157, and over which said rewind gear 156 is fitted, a shutter release disk 159 fast with said hub 158, and a stud 160 supported in a wall of the said housing for said shutter mechanism and on which said hub 158 is free to turn.

27. A shutter mechanism according to claim 26, but wherein said shutter release disk 159 has an index hole or holes and the shutter rewind gear 156 has a pin or pins engageable with and disengageable from said index hole or holes, whereby the said shutter rewind gear 156 may be disconnected from the said shutter release disk 159 when selecting a new curtain aperture.

28. A shutter mechanism according to claim 26, but wherein said shutter release disk 159 is provided with a holding notch 166 to hold the shutter in set condition when the curtain is fully wound, and a shutter release lever 168 mounted in a wall of said housing and having a detent to engage said holding notch in said release disk 159.

29. Shutter mechanism for photographic cameras of the single-curtain type, wherein a separate aperture is provided for each shutter speed, a rewind gear 156 having a shutter release disk 159 mounted concentrically therewith in a face-to-face relation, said disk having an index hole or holes therein, the said rewind gear 156 having a pin or pins engageable with said index hole or holes, the construction being such that said rewind gear 156 may be disconnected from said shutter release disk 159 by axial movement with respect thereto, when selecting a new curtain aperture.

30. Shutter mechanism for photographic cameras in accordance with claim 29, but wherein the said disk 159 is provided with a holding notch and wherein a shutter release lever is provided with a detent to engage said notch.

31. Shutter mechanism for photographic cameras in accordance with claim 29, but wherein the said disk 159 is provided with a holding notch, and wherein a shutter release lever is provided with a detent to engage said notch, and wherein a spring is provided tending to turn said shutter release lever in one direction, and wherein the tension of the curtain shutter upon the shutter release disk 159 is opposed by said shutter release lever when its detent is engaged with the said holding notch.

32. Shutter mechanism for photographic cameras of the single-curtain type wherein a separate aperture is provided for each shutter speed, a shutter rewind gear 156, a pinion 157 attached thereto and having a sleeve with a threaded bushing fitted thereto, a shutter setting knob on said bushing, a disk 159, said disk and rewind gear 156 having interengageable driving formations, and a spring, one end whereof engages said knob, and said spring tending to keep the said formation of said disk and rewind gear in driving engagement, but permitting separation from each other for the purpose of selecting a different curtain aperture.

33. Shutter mechanism for photographic cameras of the single-curtain type wherein a separate aperture is provided for each shutter speed, a shutter rewind gear 156, a disk 159 in face-to-face relation with said shutter rewind gear 156, said disk and rewind gear having interengageable formations adapted to be separated in changing shutter speeds, a shutter setting knob 37 operatively connected to said shutter rewind gear 156 and spring means tending to keep the said formations of the said shutter rewind gear and said disk in driving engagement.

34. Shutter mechanism for photographic cameras in accordance with claim 33, but wherein the said shutter setting knob is of hollow construction wherein is received a knob-return coiled spring 280, one end whereof engages said knob 37, and wherein there is a shaft 160 receiving said shutter setting knob, the said shaft having a cover plate 282 confining said spring 280 within said setting knob.

35. Shutter mechanism for photographic cameras in accordance with claim 33, but wherein a shaft 160 is mounted in the housing of said mechanism and receives thereon a shutter setting knob 37 of hollow formation wherein is received a coiled spring 280 tending to maintain said engageable formations in driving engagement with each other, and wherein the said shaft 160 is provided with a cover plate 282 and a retaining washer 281 against which latter said coiled spring 280 presses.

36. Shutter mechanism for photographic cameras in accordance with claim 33, but wherein there is provided a rewinding gear 177 with which said rewind gear 156 is adapted to mesh but from which said rewind gear 156 may be disengaged while selecting a different curtain aperture.

37. Shutter mechanism for photographic cameras in accordance with claim 33, but wherein there is provided a rewinding gear 177 with which said rewind gear 156 is adapted to mesh but from which said rewind gear 156 may be disengaged while selecting a different curtain aperture, said disk 159 having a holding notch and a shutter release lever 168 having means to engage said holding notch to hold said disk 159 stationary.

38. A shutter mechanism in accordance with claim 29, but wherein means is provided for indicating the position of the shutter curtain with respect to its several apertures, such means including a mechanism plate, an index gear 284 mounted on said mechanism plate to turn freely, and a pinion 157 with which said gear 284 meshes, the mechanism casing having an index plate through a window of which the shutter setting can be read on said gear 284.

39. A shutter mechanism in accordance with claim 33, but wherein means is provided to prevent over-movement of the shutter curtain by said shutter curtain knob 37.

40. A shutter mechanism in accordance with claim 33, but wherein means is provided to prevent over-movement of the shutter curtain by said shutter curtain knob 37, such means to prevent over-movement including an index gear 284 having a laterally projecting pin or pins and interlocking means to engage such pin or pins.

41. In photographic shutter mechanism of the shutter-curtain type, having a shutter curtain knob, means for preventing over-movement of the shutter curtain by the operator's turning movement of said knob, such means including an index gear 284 having a projecting pin 288, shutter rewind gear 156 operatively connected to said curtain knob, a winding gear 177 to be engaged at times by said shutter rewind gear 156, a stud 289 on a wall of the camera, a detent plate 299 held from turning on said stud 289 and having a detent finger 300, said detent plate 295 being movable into a plane to bring its detent finger 300 into position to be engaged by said pin 288 if the said setting knob 37 is turned too far in either direction.

42. Shutter mechanism of the character specified in claim 41, but wherein a housing 293 is fitted over the said stud 289 and is provided with an enlarged diameter 294 having said detent plate 295 attached thereto.

43. Shutter mechanism of the character specified in claim 41, but wherein a housing 293 is fitted over the said stud 289 and is provided with an enlarged diameter 294 having said detent plate 295 attached thereto, and wherein said detent plate is provided with a key member 293, and the stud 289 is provided with a slot 292 into which said key member 297 fits to prevent the said detent plate 295 from turning on said stud 289.

44. Shutter mechanism of the character specified in claim 41, but wherein a housing 293 is fitted over said stud and has an enlarged diameter 294, and wherein there is provided a spring 298 upon the cover 43 of the shutter mechanism housing tending to force the said detent plate 295 against the said enlarged diameter 294.

45. In shutter mechanism of the curtain shutter type, means to prevent changing the shutter speed of said curtain when the curtain is run down, including a shutter setting knob 37, a shutter rewind gear 156 operatively connected thereto, a shutter release disk 159, a rewind interlock member 256 and interlock means operated by said rewind interlock member 256, such means including a laterally extending arm 270 from said interlock member 256, a projection 271 from said arm 270, and a bent-over member 301 extending from said projection 271, said member 301 being adapted to overlie the shutter rewind gear 156, thereby preventing the said shutter setting knob 37 from being moved to change the shutter curtain relationship with respect to the said shutter release disk 159.

46. A photographic camera in accordance with claim 2, but wherein the means for rewinding the shutter includes a shutter operating handle 39, and wherein there is interlock means governed by the movement of the said shutter release lever 40 in causing the release of the shutter and the complete running-down thereof to lock said operating handle 39 following the rewinding of the shutter, until after the next exposure occurring through the shutter release movement of the shutter release lever 40.

47. A photographic camera in accordance with claim 2, but wherein the means for rewinding the shutter includes a shutter operating, manually manipulative handle 39, and wherein there are interlocking means to lock the said handle 39 when the shutter is rewound by the handle 39, and wherein the said shutter operating handle 39, when manually moved to rewind the shutter, allows to be moved the interlock means of the manually operable shutter release lever 40, thereby unlocking said release lever 40, and wherein said release lever 40, when so manually moved to release the said shutter, moves the said interlocking means of the shutter operating handle 39, thereby unlocking said interlocking means of the shutter operating handle 39.

48. A photographic camera in accordance with claim 2, but wherein the means for rewinding the shutter includes, a shutter operating handle 39, and wherein there is a rewind interlock member 256 therefor, and wherein also there is an interlock member 321 for the release lever 40, and wherein the said shutter operating handle 39, when manually moved to rewind the shutter and thereupon completes the rewinding thereof, effects movement of the interlock member 321 for the release lever 40, thereby unlocking said release lever 40, and wherein the said release lever 40, when it is moved to and thereupon releases the said shutter, effects movement of the interlock member 256 of the shutter operating handle 39, thereby unlocking said shutter operating handle 39.

49. A photographic camera in accordance with claim 2, but wherein the means for rewinding the shutter includes a shutter operating handle 39, and wherein there is a rewind interlock member 256 therefor, and wherein also there is an interlock member 321 for the release lever 40, and wherein the said shutter operating handle 39, when manually moved to rewind the shutter and thereupon completes the rewinding thereof, effects movement of the interlock member 321 for the release lever 40, thereby unlocking said release lever 40, and wherein the said release lever 40, when it is moved to and thereupon releases the said shutter, effects movement of the interlock member 256 of the shutter operating handle 39, thereby unlocking said shutter operating handle 39, and wherein the said interlock member 256 for the shutter operating handle 39 is moved to lock the said handle 39 by the unlocking movement of the interlock member 321 for the release lever 40 in so unlocking said release lever 40, and wherein the said interlock member 321 for the release lever 40 is moved to lock said release lever by the unlocking movement of the interlock member 256 in unlocking said operating handle 39.

50. A photographic camera in accordance with claim 2, but wherein the means for rewinding the shutter includes a shutter operating, manually manipulative handle 39, and wherein there is a rewind interlock member 256 to lock and to unlock the said handle 39 according to the position of said interlock member 256, and wherein also there is an interlock member 321 to lock and to unlock the said release lever according to the position of said member 321, and wherein the said two interlock members are associated with each other in action and are interrelated to each other, so that each said interlock member is in its locking position when the other said interlock member is in its unlocking position, and vice versa.

51. A photographic camera in accordance with claim 2, but wherein the means for rewinding the shutter includes a shutter operating, manually manipulative handle 39, and wherein there is a rewind interlock member 256 to lock and to unlock the said handle 39 according to the position of said interlock member 256, and wherein also there is an interlock member 321 to lock and to unlock the said release lever according to the position of said member 321, and wherein the said interlock member 256 is associated in action with and is interrelated to the said interlock member 321 to cause its movement in effecting the locking of the handle 39 to effect the unlocking of the shutter release lever 40.

52. In a photographic camera, a camera body having an objective lens supported therein, a focal-plane curtain shutter, shutter release means including a manually operable shutter release member 40, shutter rewinding means including a manually operable handle member 39, a capping gate to exclude from the film light coming through the objective lens, means for opening and for closing said capping gate, means acting to close said capping gate before the shutter is rewound, means operatively connected with the means for closing said capping gate to lock said capping gate in closed position while the shutter is being rewound, and means rendering it impossible to make a second operation of the said shutter release member 40 until the shutter has been rewound by the shutter rewinding means.

53. In a photographic camera having a curtain shutter, means for operating the shutter, including a manually operable handle member 39, shutter release means including a manually operable shutter release member 40, a gear 240 carrying said release lever, a pair of pivoted capping gates to exclude light coming through the lens from the film, and operating connections from said gear 240 to said capping gates, whereby movement of said shutter release lever in one direction opens the capping gates, and means rendering it impossible to make a second operation of the said shutter release member 40 until the shutter has been rewound by the shutter rewinding means.

54. A photographic camera in accordance with claim 13, but wherein means are provided to close and lock said capping gate means while the shutter is being reset.

55. A photographic camera in accordance with claim 2, but wherein there are provided capping gate means and means to close said capping gate means so as to exclude light from the film while the shutter is being rewound.

56. A photographic camera provided with a curtain shutter, curtain shutter rewinding means, curtain shutter release means and means having a manually operable member cooperating through the shutter rewinding means and moved by movement of the shutter curtain, rendering it impossible to make a second operation of such manually operable member of the curtain shutter release means until the shutter has been rewound by the shutter rewinding means.

57. In an aerial photographic camera, a curtain shutter, curtain shutter rewinding means, curtain shutter release means, and means having a manually operable member cooperating through the shutter rewinding means, and also cooperating with the shutter release means rendering it impossible to make a second operation of the manually operable member of the curtain shutter release means until the curtain shutter has been rewound by the shutter rewinding means.

58. In a photographic camera having a focal plane shutter, means for rewinding said shutter including a driving member assembly and including a shutter operating, manually manipulable handle 39, locking means caused to lock the said handle 39 when the shutter is rewound by said handle 39, a shutter release lever 40, locking means caused by movement of the shutter curtain to lock the said release lever 40 as the shutter runs down, the said two locking means having interengaging parts that effect, by such interengagement in the respective said operating movements of said handle 39 and release lever 40, the locking of the shutter operating handle 39 by the unlocking movement of the locking means for the release lever 40 and the locking of the release lever 40 by the unlocking movement of the locking means for the shutter operating handle 39.

59. A photographic camera in accordance with claim 58, but wherein the locking means for the handle 39 includes a lever 256 having a projecting pin 327 and a notch 336, and having a lateral extension 271, and wherein the locking means for the shutter release lever 40 includes a locking member 321, a spring 323 to turn said locking member 321, and a turnable hook 325, and wherein the release lever 40 has a pin 242 to engage said hook 325, and wherein the driving member assembly for rewinding the shutter has a notch 315 to be engaged by said pin 327, and wherein there is provided a pin 337 to engage said notch 336.

60. A photographic camera in accordance with claim 58, but wherein the locking means for the handle 39 includes a rocker lever 256 having a formation to engage a formation upon the driving member assembly, and having a notch 336, and wherein pin-like means is provided to engage said notch to hold said rocker lever 256, and wherein there is a shutter rewind gear and also means controlled by the shutter rewind gear, to move the said pin-like means out of said notch 336.

61. A photographic camera in accordance with claim 58, but wherein the locking means for the handle 39 includes a rocker lever 256 having a notch-like holding formation, and wherein pin-like means is provided to engage said notch-like formation, and wherein the means for rewinding the shutter includes a rewind gear 156, and wherein there is means controlled by the movement of said shutter rewind gear 156 to withdraw said pin-like means from said notch-like formation.

62. A photographic camera in accordance with claim 58, but wherein the release lever 40 has a projecting pin 242, and wherein the locking means for the release lever 40 has a hook 325 to be engaged by said pin 242.

63. A photographic camera in accordance with claim 58, but wherein the release lever 40 has a projecting pin 242, and wherein the locking means for the release lever 40 has a hook 325 to be engaged by said pin 242, and has a formation 326, and wherein the locking means for the lever 39 includes a rocker lever 256 having a projecting pin to engage such formation 326, thereby to move the hook 325 out of engagement with the pin 242.

64. A photographic camera in accordance with claim 58, but wherein the release lever 40 has a projecting pin 242, and wherein the locking means for the release lever 40 has a hook 325 to be engaged by said pin 242 and has a formation 326, and wherein the locking means for the lever 39 includes a rocker lever 256 having a projecting pin to engage such formation 326, thereby to move the hook 325 out of engagement with the pin 242, and wherein the said rocker lever 256 is provided with a notch 326 to be engaged by a holding formation.

65. A photographic camera in accordance with claim 58, but wherein the release lever 40 has a projecting pin 242, and wherein the locking means for the release lever 40 has a hook 325 to be engaged by said pin 242 and has a formation 326, and wherein the locking means for the lever 39 includes a rocker lever 256 having a projecting pin to engage such formation 326, thereby to move the hook 325 out of engagement with the pin 242, and wherein the said rocker lever 256 is provided with a notch 336 to be engaged by a holding formation 337, and wherein there is a shutter rewind gear, and wherein means are provided to move said holding formation 337 out of the notch 336 by the movement of such shutter rewind gear.

66. A photographic camera in accordance with claim 58, but wherein the locking means for the handle 39 includes a rocker lever 256 having an extending formation, and wherein the shutter rewinding means is provided with an axially slidable gear 156 held from axial sliding movement by said extending formation.

67. A photographic camera in accordance with claim 58, but wherein the locking means for the handle 39 includes a rocker lever 256 having an extending formation, and wherein the shutter rewind mechanism includes a rewind gear 156 and a disk 159 having a pin or pins 165, and wherein the said extending formation prevents by its position the shutter rewind gear 156 from being moved out of engagement with said pin or pins 165 of disk 159, thereby preventing changing shutter speeds until the focal plane shutter has been restored to the position had just prior to the last exposure, said shutter having a plurality of apertures to permit changing shutter speeds.

68. In a photographic camera having a focal plane shutter, means for rewinding said shutter including a driving member assembly, and including a shutter operating manually manipulable handle 39, and including a shutter rewind gear 156, and a disk 159 having a pin or pins 165 to engage said rewind gear but disengageable therefrom, locking means caused to lock the said handle 39 when the shutter is rewound by said handle 39, the said locking means including a movable member 256 having a formation to interact with the shutter rewind gear 156 to prevent disengagement of said gear 156 from the pin or pins of the disk 159, thereby preventing changing shutter speed until the focal plane shutter has been restored to the position had just prior to the last exposure, said shutter having a plurality of apertures to permit changing shutter speeds.

69. In a photographic camera having a focal plane shutter, means for rewinding said shutter including a driving member assembly, and including a shutter operating manually manipulable handle 39, and including a shutter rewind gear 156, and a disk 159 having a pin or pins 165 to engage said rewind gear, locking means caused to lock the said handle 39 when the shutter is rewound by said handle 39, the said locking means including a movable member 256, the disk 159 having a pin 267 to engage said movable member 256 to unlock the locking means for said handle 39.

70. In a photographic camera having a focal plane shutter, means for rewinding said shutter including a driving member assembly, and including a shutter operating manually manipulable handle 39, and including a shutter rewind gear 156, and a disk 159 having a pin or pins 165 to engage said rewind gear, locking means caused to lock the said handle 39 when the shutter is rewound by said handle 39, the said locking means including a movable member 256, the disk 159 having a pin 267 to engage said movable member 256 to unlock the locking means for said handle 39, a shutter release lever 40 and locking means for said release lever 40 and acted upon by said movable member 256, said locking means for the release lever 40 including a turnable locking member 321 and a hook 325 movable therewith, the said release lever 40 having a pin 242 to engage said hook.

71. In a photographic camera having a focal plane shutter having a plurality of apertures to permit changing shutter speeds, means for rewinding said shutter including a driving member assembly, and including a shutter operating manually manipulable handle 39, and including a shutter rewind gear 156, and a disk 159 having a pin or pins 165 to engage said rewinding gear but disengageable therefrom, locking means caused to lock the said handle 39 when the shutter is rewound by said handle 39, the said locking means including a movable member 256 having a formation to overlie the shutter rewind gear 156 to prevent disengagement of said gear 156 from the pin or pins of the disk 159, thereby preventing changing shutter speed when the said handle 39 is in its unlocked condition.

72. In a photographic camera a focal plane shutter having a plurality of apertures to permit changing shutter speeds, shutter rewinding means including a shutter rewind gear 156, a shutter release lever 40, upon releasing movement of which the shutter is allowed to run down, locking means for said shutter release lever 40, means co-acting with said locking means to render the latter effective when said shutter rewind gear runs all the way down, and co-acting means to prevent changing shutter speeds except when the focal plane shutter is in condition for making an exposure.

73. In a photographic camera a focal plane shutter having a plurality of apertures to permit changing shutter speeds, shutter rewinding means including a shutter rewind gear 156, a shutter release lever 40, upon releasing movement of which the shutter is allowed to run down, locking means for said shutter release lever 40, means co-acting with said locking means to render the latter effective when said shutter rewind gear 156 runs all the way down, and co-acting means to prevent changing shutter speeds except when the focal plane shutter is in condition for making an exposure, such means preventing change of shutter speeds including a disk 159 having a pin or pins 165 to be engaged with and disengaged from said shutter rewind gear 156, as permitted by said means for preventing change of shutter speeds.

74. In a photographic camera a focal plane shutter having a plurality of apertures to permit changing shutter speeds, shutter rewinding means including a shutter rewind gear 156, a shutter release lever 40, upon releasing movement of which the shutter is allowed to run down, locking means for said shutter release lever 40, means co-acting with said locking means to render the latter effective when said shutter rewind gear 156 runs all the way down, and co-acting means to prevent changing shutter speeds except when the focal plane shutter is in condition for making an exposure, such means preventing change of shutter speeds including a disk 159 having a pin or pins 165 to be engaged by and disengaged from said shutter rewind gear 156, as permitted by said means for preventing change of shutter speeds, said rewind gear 156 and disk 159 being co-axially mounted in proximity and relatively movable toward and from each other, and held from such movement to prevent change in shutter speeds.

75. In a photographic camera a focal plane shutter having a plurality of apertures to permit changing shutter speeds, shutter rewinding means including a shutter rewind gear 156, a shutter release lever 40, upon releasing movement of which the shutter is allowed to run down, locking means for said shutter release lever 40, means co-acting with said locking means to render the latter effective when said shutter rewind gear 156 runs all the way down, and co-acting means to prevent changing shutter speeds except when the focal plane shutter is in condition for making an exposure, such means preventing change of shutter speeds including a disk 159 having a pin or pins 165 to be engaged by and disengaged from said shutter rewind gear 156, as permitted by said means for preventing change of shutter speeds, said disk 159 having a peripheral notch 165, a dog 167 engageable with said notch, and means co-acting with said shutter release lever 40 to disengage said dog from said notch.

76. A photographic camera in accordince with claim 24, but wherein there are provided locking means to lock the manually operable handle member 39 when the shutter is rewound by said handle 39, and locking means caused to lock the said release lever 40 when the shutter runs down.

77. A photographic camera in accordance with claim 24, but wherein there are provided locking means to lock the manually operable handle member 39 when the shutter is rewound by said handle 39, and locking means caused to lock the said release lever 40 when the shutter runs down, the said two locking means having interengaging parts that effect by such interengagement the locking of the shutter operating handle member 39 by the unlocking movement of the locking means for the release lever 40 and the locking of the release lever 40 by the unlocking movement of the locking means for the shutter operating handle member 39.

78. In a photographic camera, a shutter mechanism including a single shutter curtain having a plurailty of different-area apertures therein, a shutter curtain shaft, a stud having a shutter rewind gear thereon, a shutter release disk, said shutter rewind gear and said disk being co-axial and disconnectable to permit turning of said shutter rewind gear to select a different curtain aperture, and having interengaging formations, a shutter rewind interlock member having a part to be moved into such proximity to said shutter rewind gear and disk as to prevent them from being disconnected for selection of a different shutter curtain aperture, means for so moving said interlock member upon the running down of the shutter curtain, said disk having a formation to be engaged for holding the disk and shutter rewind gear from turning movement when the shutter curtain is fully rewound, and co-acting means to engage said formation to hold said disk and gear from rotation while so engaged.

79. A photographic shutter mechanism in accordance with claim 78, but wherein the said shutter rewind interlock member includes a lever 256 having an extension to overly the said shutter rewind gear.

80. A photographic shutter mechanism in accordance with claim 78, but wherein the said shutter rewind interlock member includes a lever 256 having an extension to overly the said shutter rewind gear, and wherein there is a movable shutter release interlock member adapted to be brought into interengagement with said lever 256 to act thereon and to move its said extension from its position overlying the shutter rewind gear upon rewinding the shutter curtain.

ARCHIE H. GOREY.
LOUIS D. NADEL.
EDSON S. HINELINE.